(12) United States Patent
Paul

(10) Patent No.: US 11,025,582 B1
(45) Date of Patent: Jun. 1, 2021

(54) SYSTEMS AND METHODS FOR CREATING MULTIPLE RENDITIONS OF A SOCIAL MEDIA COMPOSITION FROM INPUTS TO A SINGLE DIGITAL COMPOSER

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 18 days.

(21) Appl. No.: 16/122,826

(22) Filed: Sep. 5, 2018

(51) Int. Cl.
*H04L 12/58* (2006.01)
*G06F 16/438* (2019.01)
*G06F 16/2457* (2019.01)

(52) U.S. Cl.
CPC ........ *H04L 51/32* (2013.01); *G06F 16/24573* (2019.01); *G06F 16/4393* (2019.01); *H04L 51/36* (2013.01)

(58) Field of Classification Search
CPC ... H04L 51/32; H04L 51/36; G06F 16/24573; G06F 16/4393
USPC ........................................................ 709/206
See application file for complete search history.

(56) References Cited

U.S. PATENT DOCUMENTS

| | | |
|---|---|---|
| D341,848 S | 11/1993 | Bigelow et al. |
| 6,167,406 A | 12/2000 | Hoskins et al. |
| D437,342 S | 2/2001 | Kramer et al. |
| D663,314 S | 7/2012 | David et al. |
| 8,554,875 B1 | 10/2013 | Alfaro et al. |
| D701,228 S | 3/2014 | Lee |
| D727,339 S | 4/2015 | Lee |
| 9,118,723 B1 | 8/2015 | Su et al. |
| D741,897 S | 10/2015 | Wilkinson et al. |
| D743,999 S | 11/2015 | Villamor et al. |
| 9,251,124 B2 | 2/2016 | Steinfl et al. |
| D753,703 S | 4/2016 | Villamor et al. |
| D764,511 S | 8/2016 | Han et al. |
| D768,668 S | 10/2016 | Anzures et al. |
| D768,688 S | 10/2016 | Chow-Quan |

(Continued)

OTHER PUBLICATIONS

Preinterview First Office Action received for U.S. Appl. No. 16/112,815 dated Nov. 29, 2019, 12 pages.

(Continued)

*Primary Examiner* — Meng Vang
(74) *Attorney, Agent, or Firm* — FisherBroyles, LLP

(57) ABSTRACT

Systems and methods for creating multiple renditions of a social media composition may include (1) determining, on a user device including at least one processor, that a user has opened a social media application that allows user compositions to be viewed using multiple different consumption channels, (2) providing, on a display element of the user device, a composition screen configured to be used to create user compositions for use with any of the different consumption channels, (3) collecting, via the composition screen, user-selected content including (i) a media item submitted via the composition screen, (ii) text submitted via the composition screen and/or (iii) a metadata item submitted via the composition screen, and (4) in response to collecting the user-selected content, creating a first user composition to be viewed from a first consumption channel and/or a second user composition to be viewed from a second consumption channel, each of which is based on the user-selected content. Various other methods, systems, and computer-readable media are also disclosed.

20 Claims, 17 Drawing Sheets

(56) References Cited

U.S. PATENT DOCUMENTS

| | | | |
|---|---|---|---|
| D771,644 S | 11/2016 | Jewitt et al. | |
| D772,906 S | 11/2016 | Fu | |
| D776,692 S | 1/2017 | Armstrong | |
| 9,639,969 B1 | 5/2017 | Wilson et al. | |
| D789,389 S | 6/2017 | Kim et al. | |
| D789,956 S | 6/2017 | Ortega et al. | |
| D803,257 S | 11/2017 | Graham et al. | |
| 9,911,300 B2 | 3/2018 | Herbst et al. | |
| D822,689 S | 7/2018 | Amidei et al. | |
| D823,871 S | 7/2018 | Verdu Orts et al. | |
| D831,059 S | 10/2018 | Bao | |
| 10,126,927 B1 | 11/2018 | Fieldman | |
| D837,240 S | 1/2019 | Van Tricht | |
| D838,732 S | 1/2019 | Furdei et al. | |
| D838,741 S | 1/2019 | Tijerina et al. | |
| D841,024 S | 2/2019 | Clediere et al. | |
| D842,871 S | 3/2019 | Clediere et al. | |
| 10,263,802 B2 | 4/2019 | Burns et al. | |
| D852,213 S | 6/2019 | Clediere et al. | |
| D852,215 S | 6/2019 | Westerhold et al. | |
| D852,832 S | 7/2019 | Westerhold et al. | |
| D859,442 S | 9/2019 | Zhang et al. | |
| D861,715 S | 10/2019 | Haile et al. | |
| D890,198 S | 7/2020 | Paul | |
| D894,921 S | 9/2020 | Paul | |
| 10,942,978 B1 | 3/2021 | Paul | |
| 2003/0179223 A1 | 9/2003 | Ying et al. | |
| 2005/0114374 A1 | 5/2005 | Juszkiewicz et al. | |
| 2009/0125588 A1 | 5/2009 | Black et al. | |
| 2010/0153886 A1 | 6/2010 | Hautala | |
| 2010/0257490 A1 | 10/2010 | Lyon et al. | |
| 2011/0050975 A1 | 3/2011 | Chung | |
| 2011/0087994 A1 | 4/2011 | Swink et al. | |
| 2011/0264582 A1 | 10/2011 | Kim et al. | |
| 2012/0308209 A1 | 12/2012 | Zaletel | |
| 2012/0323930 A1 | 12/2012 | Kennberg et al. | |
| 2013/0111395 A1 | 5/2013 | Ying et al. | |
| 2013/0124634 A1* | 5/2013 | Weinstein | G06Q 30/02 709/204 |
| 2013/0332831 A1* | 12/2013 | Birnkrant | H04N 21/8113 715/719 |
| 2013/0332850 A1 | 12/2013 | Bovet et al. | |
| 2014/0040775 A1 | 2/2014 | Stoop et al. | |
| 2014/0089833 A1 | 3/2014 | Hwang et al. | |
| 2014/0129627 A1 | 5/2014 | Baldwin et al. | |
| 2014/0181010 A1* | 6/2014 | Imbruce | G06F 16/35 707/609 |
| 2014/0189608 A1 | 7/2014 | Shuttleworth et al. | |
| 2014/0237055 A1 | 8/2014 | Burrell et al. | |
| 2014/0244621 A1 | 8/2014 | Lindsay | |
| 2014/0244622 A1 | 8/2014 | Lindsay et al. | |
| 2014/0280629 A1 | 9/2014 | Rubinstein et al. | |
| 2014/0282077 A1 | 9/2014 | Wilson et al. | |
| 2015/0012525 A1 | 1/2015 | Lindsay | |
| 2015/0020170 A1 | 1/2015 | Talley | |
| 2015/0106731 A1* | 4/2015 | Matas | H04L 67/306 715/744 |
| 2015/0134603 A1 | 5/2015 | Melamed et al. | |
| 2015/0149967 A1 | 5/2015 | Bernstein et al. | |
| 2015/0199770 A1 | 7/2015 | Wallenstein | |
| 2015/0286371 A1 | 10/2015 | Degani | |
| 2015/0312184 A1 | 10/2015 | Langholz et al. | |
| 2016/0006679 A1 | 1/2016 | Williams et al. | |
| 2016/0011758 A1* | 1/2016 | Dornbush | H04L 65/601 348/14.03 |
| 2016/0092064 A1 | 3/2016 | Wu | |
| 2016/0119751 A1 | 4/2016 | Park et al. | |
| 2016/0132200 A1 | 5/2016 | Walkin et al. | |
| 2016/0149843 A1* | 5/2016 | Spicer | G06Q 10/101 709/206 |
| 2016/0219057 A1 | 7/2016 | Das et al. | |
| 2017/0127128 A1 | 5/2017 | Seger | |
| 2017/0149714 A1 | 5/2017 | Valdivia et al. | |
| 2017/0337747 A1 | 11/2017 | Hull | |
| 2018/0121065 A1 | 5/2018 | Seo et al. | |
| 2018/0183738 A1* | 6/2018 | Parnell | G06F 3/0483 |
| 2018/0191797 A1 | 7/2018 | Javier et al. | |
| 2018/0191962 A1 | 7/2018 | Javier et al. | |
| 2019/0200051 A1 | 6/2019 | Paul et al. | |

OTHER PUBLICATIONS

Non-Final Office Action received for U.S. Appl. No. 16/122,838 dated Oct. 16, 2019, 15 pages.

Final Office Action received for U.S. Appl. No. 16/122,838 dated Dec. 16, 2019, 17 pages.

"Welcome to Kanazawa", URL: https://web.archive.org/web/20150407020335/http://www.ishikawakintetsu.co.jp/howto_en.html, Apr. 7, 2015, 2 pages.

Paul, Debashish, "Systems and Methods for Creating Interactive Metadata Elements in Social Media Compositions", U.S. Appl. No. 16/114,157 dated Aug. 27, 2018, 58 pages.

Non-Final Office Action received for U.S. Appl. No. 29/660,463 dated Oct. 22, 2019, 11 pages.

Ong, Thuy, ""Facebook rolls out GIF-supported polls feature to web and mobile apps"", URL: https://www.theverge.com/2017/11/3/16602592/facebook-polls-feature-web-ios-android-apps, Nov. 3, 2017, pp. 1-2.

Notice of Allowance received for U.S. Appl. No. 29/660,463 dated Feb. 6, 2020, 37 pages.

Nesterov, Anatoly, "7 Types of Animations for Your Mobile App", URL: https://web.archive.org/web/20160315010906/https://yalantis.com/blog/-seven-types-of-animations-for-mobile-apps, Mar. 15, 2016, pp. 1-15.

Non-Final Office Action received for U.S. Appl. No. 29/660,466 dated Oct. 23, 2019, 9 pages.

Ex Parte Quayle Action received for U.S. Appl. No. 29/660,466, filed Feb. 10, 2020, 19 pages.

Arpost, "The AR City App from Blippar promises better-than-GPS navigation thanks to augmented reality", URL: arpost.co/2017/11/17 far-city-augmented-reality-navigation, Nov. 17, 2017, 2 pages.

Final Office Action received for U.S. Appl. No. 16/112,815 dated Feb. 18, 2020, 26 pages.

Non-Final Office Action received for U.S. Appl. No. 16/112,815 dated Apr. 29, 2020, 43 pages.

Non-Final Office Action received for U.S. Appl. No. 16/122,838 dated Mar. 6, 2020, 17 pages.

Final Office Action received for U.S. Appl. No. 16/122,838 dated May 26, 2020, 30 pages.

Preinterview First Office Action received for U.S. Appl. No. 16/114,157 dated Mar. 30, 2020, 32 pages.

Paul, Debashish, "Display Screen with Graphical User interface", U.S. Appl. No. 29/732,572, filed Apr. 24, 2020, 14 pages.

Notice of Allowance received for U.S. Appl. No. 29/660,466 dated Apr. 29, 2020, 20 pages.

Final Office Action received for U.S. Appl. No. 16/114,157 dated Sep. 1, 2020, 92 pages.

Final Office Action received for U.S. Appl. No. 16/112,815 dated Oct. 1, 2020, 44 pages.

Notice of Allowance received for U.S. Appl. No. 16/114,157 dated Nov. 23, 2020, 96 pages.

Notice of Allowance received for U.S. Appl. No. 16/112,815 dated Feb. 3, 2021, 54 pages.

\* cited by examiner

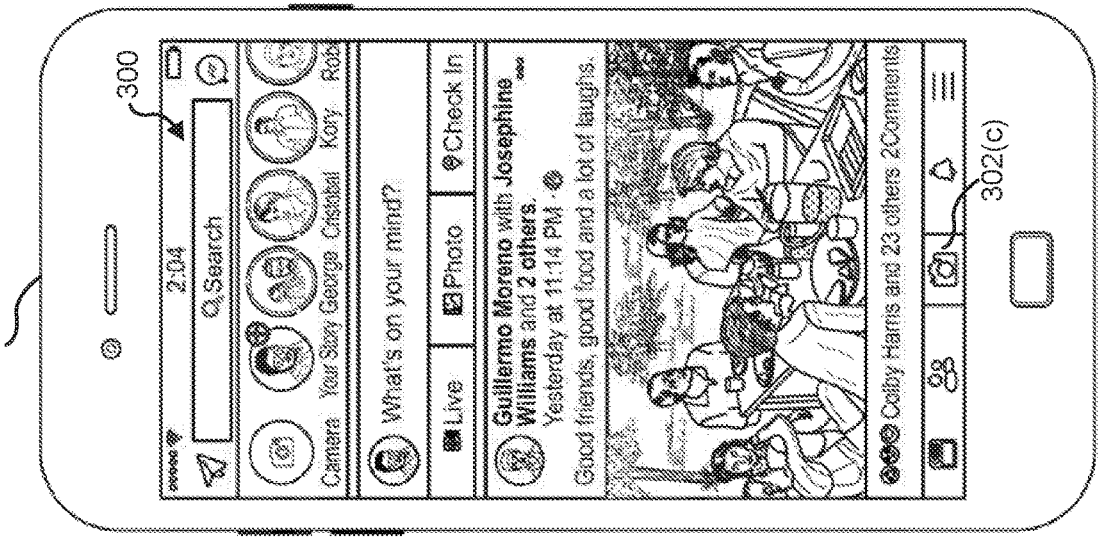
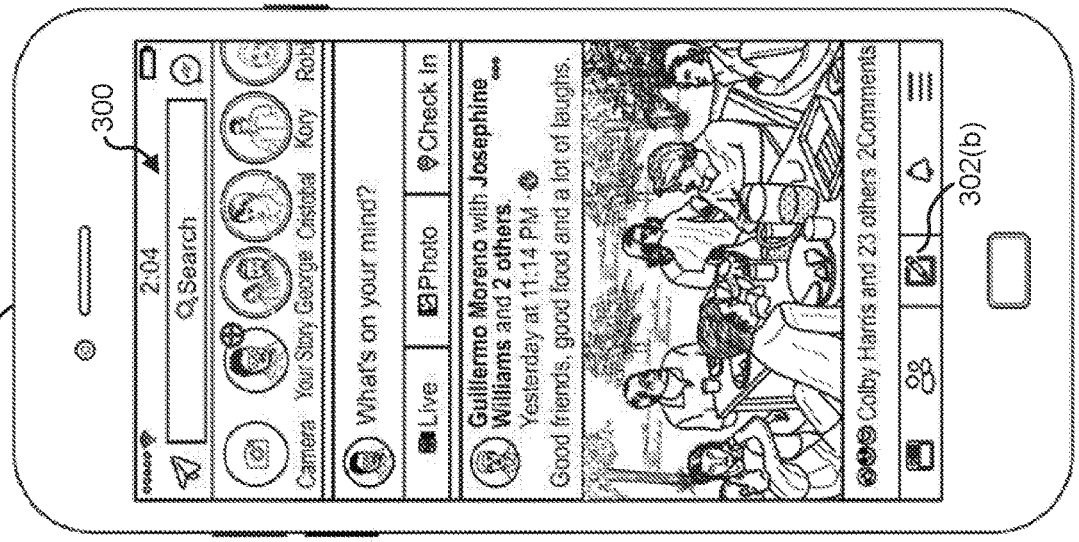
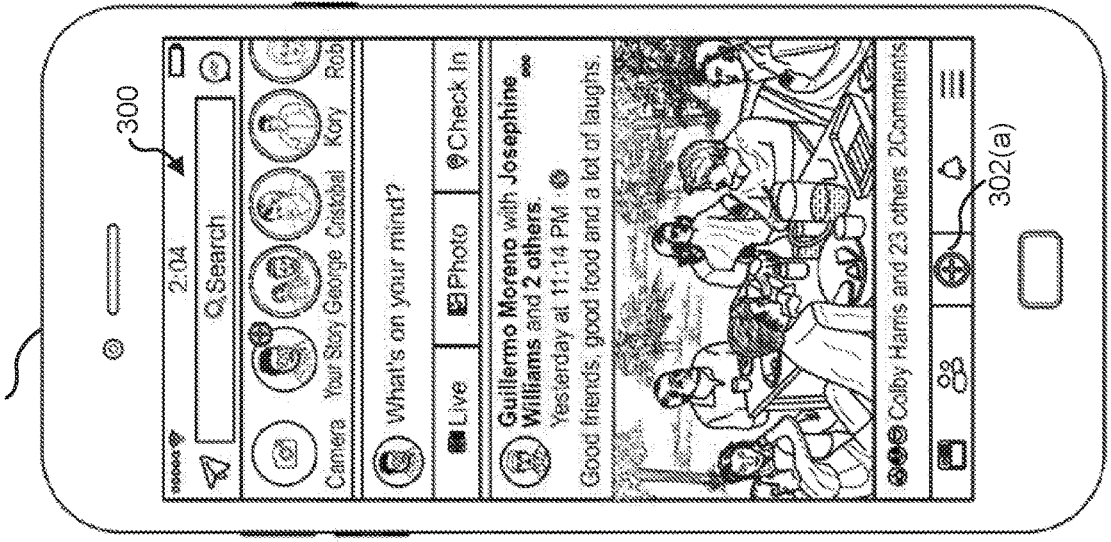
FIG. 3A
FIG. 3B
FIG. 3C

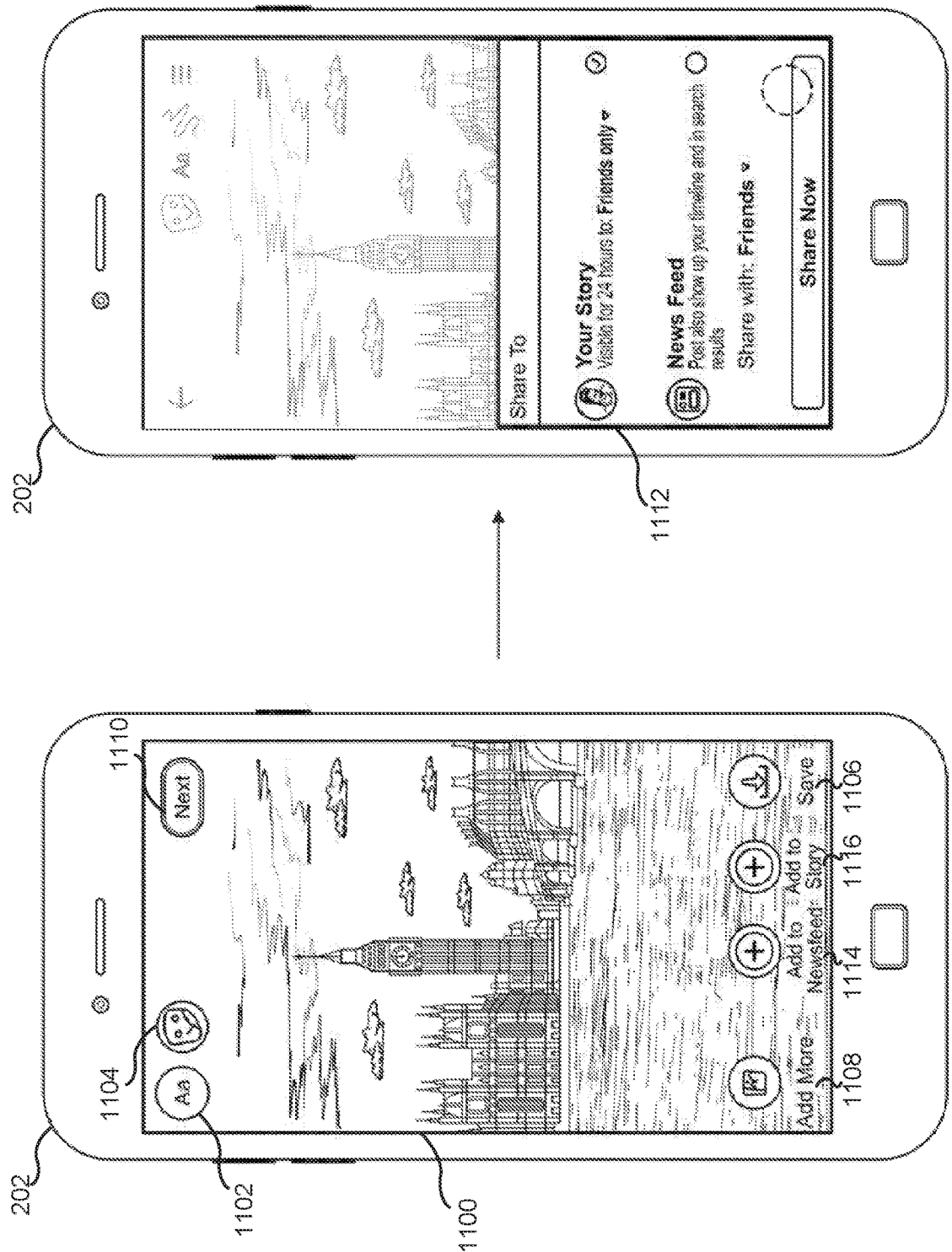

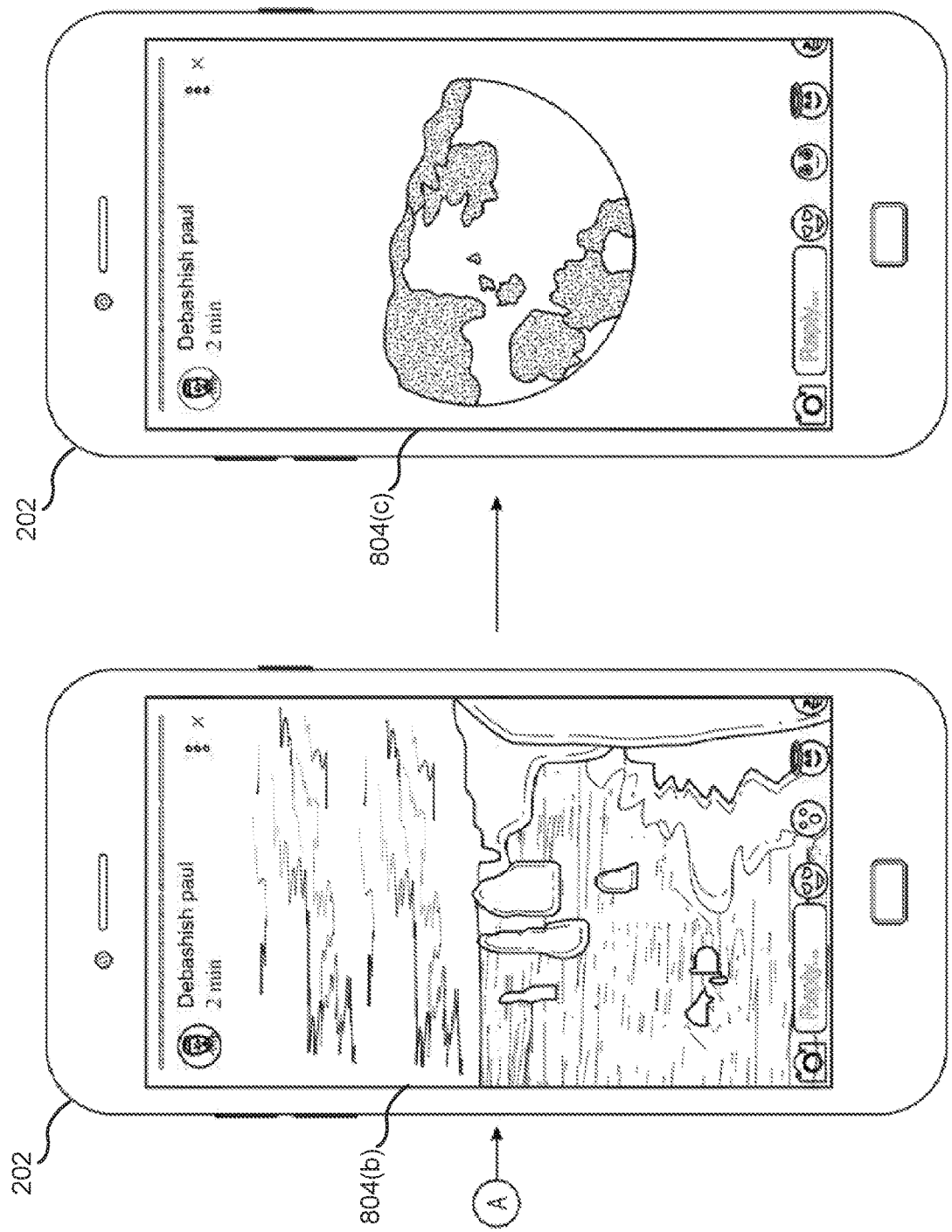

SYSTEMS AND METHODS FOR CREATING MULTIPLE RENDITIONS OF A SOCIAL MEDIA COMPOSITION FROM INPUTS TO A SINGLE DIGITAL COMPOSER

BACKGROUND

Members of social-networking platforms may create social media compositions to be consumed from an increasing number of different consumption channels. For example, a user may create social media compositions to be consumed from either a newsfeed consumption channel and/or a stories consumption channel. Increasing the number of consumption channels to which a user may post a social media composition may expand his or her digital creative range. However, the increase in choice may also complicate a digital creation process, confusing users. The disclosed systems and methods, therefore, identify a need for improved systems and methods for creating social media compositions for multiple channels using a single composition flow.

SUMMARY

As will be described in greater detail below, the instant disclosure describes various systems and methods for creating multiple renditions of a social media composition using inputs to a single digital composer. In one example, a computer-implemented method may include (1) determining, on a user device including at least one processor, that a user has opened a social media application that allows user compositions to be viewed using multiple different consumption channels, (2) providing, on a display element of the user device, a composition screen configured to be used to create user compositions for use with any of the different consumption channels, (3) collecting, via the composition screen, user-selected content including (i) a media item submitted via the composition screen, (ii) text submitted via the composition screen and/or (iii) a metadata item submitted via the composition screen, and (4) in response to collecting the user-selected content, creating a first user composition to be viewed from a first consumption channel and/or a second user composition to be viewed from a second consumption channel, each of which is based on the user-selected content. In some examples, the method may further include posting the first user composition in the first consumption channel and/or posting the second user composition in the second consumption channel.

In one embodiment, the first user composition may include one or more features that differ from the features of the second user composition and that coincide with one or more features of the first consumption channel. In this embodiment, the second user composition may include one or more features that differ from the features of the first user composition and that coincide with one or more features of the second composition channel. For example, the first user composition may superimpose a metadata item over a media item and the second user composition, rather than superimpose the metadata item over the media item, may use text extracted from the metadata item as a caption for the media item.

In another example, collecting the user-selected content may include collecting photographs and text submitted via the composition screen. In this example, (1) the first user composition may include a slideshow of the photographs with a cover card that includes the text and (2) the second user composition may include a collage of the plurality of photographs with a caption that includes the text. In one embodiment, (1) the first user composition may represent a story and the first consumption channel may represent a stories channel and (2) the second user composition may represent a news item and the second consumption channel may represent a newsfeed.

In some examples, collecting the user-selected content via the composition screen may include collecting the user-selected content directly from the composition screen. Alternatively, collecting the user-selected content via the composition screen may include collecting the user-selected content from an additional screen linked to the composition screen.

In some embodiments, collecting the user-selected content may include collecting a metadata item submitted via the composition screen. In one such embodiment, the metadata item may include one or more digital stickers. In this embodiment, the first user composition may include a version of the digital stickers that differs in appearance from a version of the digital stickers included in the second user composition. The metadata items may include a variety of metadata such as friends metadata, location metadata, and feelings metadata.

In one example, the composition screen may represent an initial composition landing screen presented in response to receiving user input initiating a social composition process. In some examples, the method may include creating both the first user composition and the second user composition. In these examples, the computer-implemented method may also include posting the first user composition in the first consumption channel and posting the second user composition in the second consumption channel.

In one embodiment, a system for implementing the above-described method may include (1) a determination module, stored in memory, that determines, on a user device including at least one processor, that a user has opened a social media application that allows user compositions to be viewed using multiple different consumption channels, (2) a composition module, stored in memory, that (i) provides, on a display element of the user device, a composition screen configured to be used to create user compositions for use with any of the different consumption channels, (ii) collects, via the composition screen, user-selected content including a media item submitted via the composition screen, text submitted via the composition screen, and/or a metadata item submitted via the composition screen, (iii) creates a first user composition, to be viewed from a first consumption channel, and/or a second user composition, to be viewed from a second consumption channel, each of which is based on the user-selected content and, (iv) posts the first user composition in the first consumption channel and/or the second user composition in the second consumption channel, and (3) at least one physical processor configured to execute the determination module and the composition module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine, on a user device including at least one processor, that a user has opened a social media application that allows user compositions to be viewed using multiple different consumption channels, (2) provide, on a display element of the user device, a composition screen configured to be used to create user compositions for use with any of the different consumption channels, (3) collect, via the composition screen, user-selected content including a media item submitted via the composition screen, text submitted via the composition screen and/or a metadata item submitted via the composition screen, (4) create a first user composition, to be viewed from a first consumption channel, and/or a second user composition, to be viewed from a second consumption channel, each of which is based on the user-selected content, and (5) post the first user composition in the first consumption channel and/or the second user composition in the second consumption channel.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 3A-3C are illustrations of an exemplary predecessor screen that navigates to a composition screen.

FIGS. 11A-11B are an illustration of an exemplary single-media creation flow.

FIGS. 13A-13D are an illustration of a first rendition of a user composition, based on the user content illustrated in FIG. 9, intended for a stories consumption channel.

Figure 1:
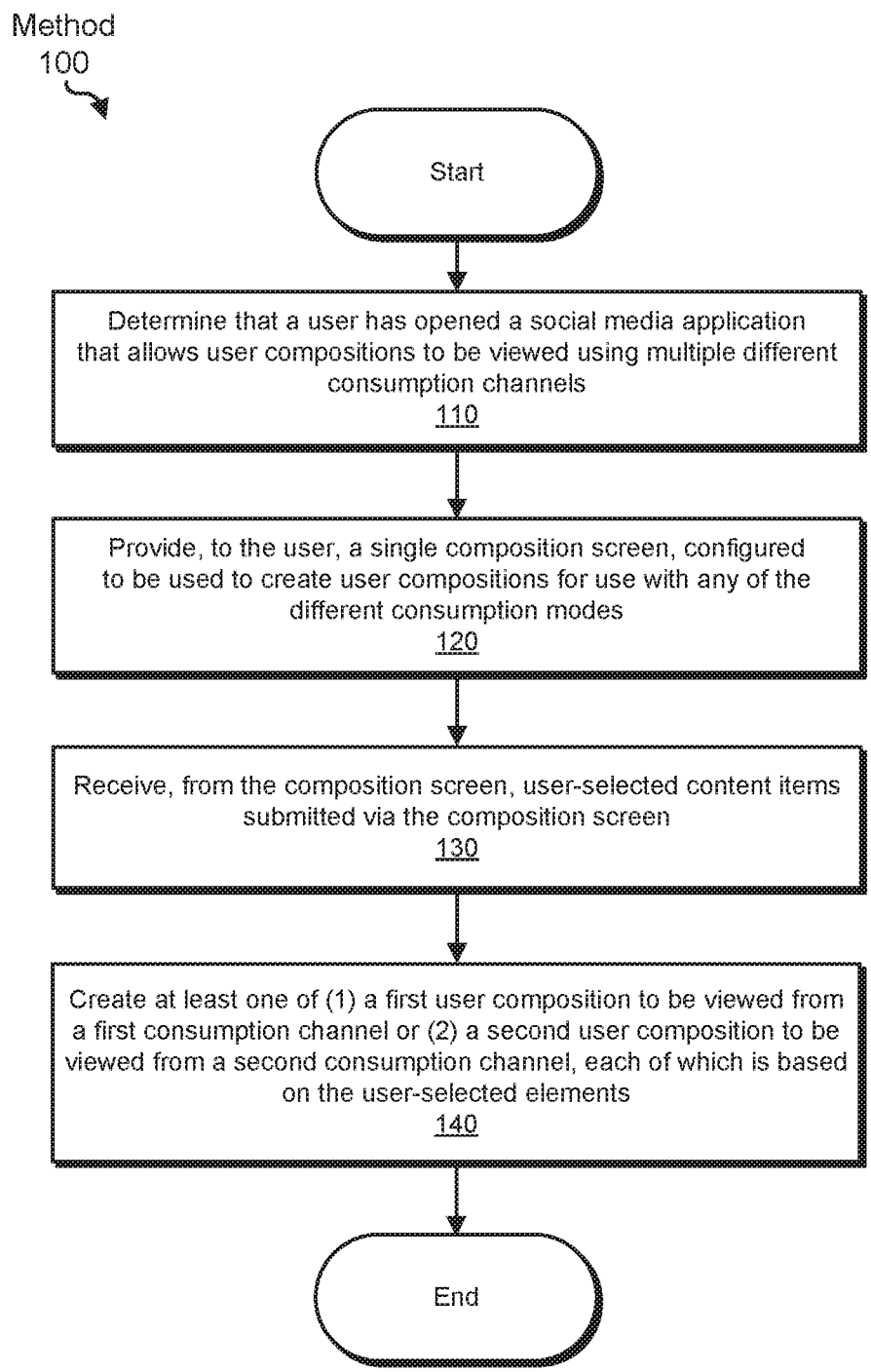
FIG. 1 is a flow diagram of an exemplary method for creating different renditions of a same composition that was created using a single composer.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to creating different rendering of a same composition from inputs to a single composer. For example, two different renderings of a composition may be created for two different consumption channels (e.g., a stories consumption channel and a newsfeed consumption channel). The different renderings may each be based on the same composition (e.g., each may include the same content), but may each have been adapted to include features that correspond to the features of a particular consumption channel. For example, if a composition includes multiple photos and text, a first rendering intended for a newsfeed consumption channel may include a collage of the multiple photos and a caption that displays the text. A second rendering intended for a stories consumption channel may include a cover page, which includes the text, followed by a multi-photo narrative, which includes the multiple photos. In some examples, what appears as a digital sticker in one rendering (e.g., a digital location sticker) may appear as text in another rendering (e.g., plain text indicating the location). In one embodiment, two different renderings of a text composition may be created (e.g., a plain text rendering and a Super Awesome Text Post (SATP) rendering) using the same user interface.

Creating multiple renditions of a composition using a single composer, instead of having a separate composer to create each rendition, may improve the functioning of a computer system by reducing data storage, processing, and associated resources and overhead. Rather than storing and processing different content for different composers, content for a single composer may be stored and processed. Thus, computing resources may be more efficiently utilized. In addition, the present disclosure provides a technical solution to a technical problem of utilizing computing resources more efficiently.

The following will provide, with reference to FIG. 1, detailed descriptions of computer-implemented methods for creating different rendering of a same composition created using a single composer. Detailed descriptions of corresponding example systems will also be provided in connection with FIG. 2. In addition, detailed descriptions of exemplary creation flows will be provided in connection with FIG. 3-16.

FIG. 1 is a flow diagram of an exemplary computer-implemented method 100 for creating multiple renditions of a social media composition using a single digital composer. The steps shown in FIG. 1 may be performed by any suitable computer-executable code and/or computing system, such as the systems described herein. In one embodiment, the steps shown in FIG. 1 may be performed by modules operating within a mobile device. For example, the steps shown in FIG. 1 may be performed by modules operating in a user device 202 as shown in exemplary system 200 in FIG. 2.

Figure 2:
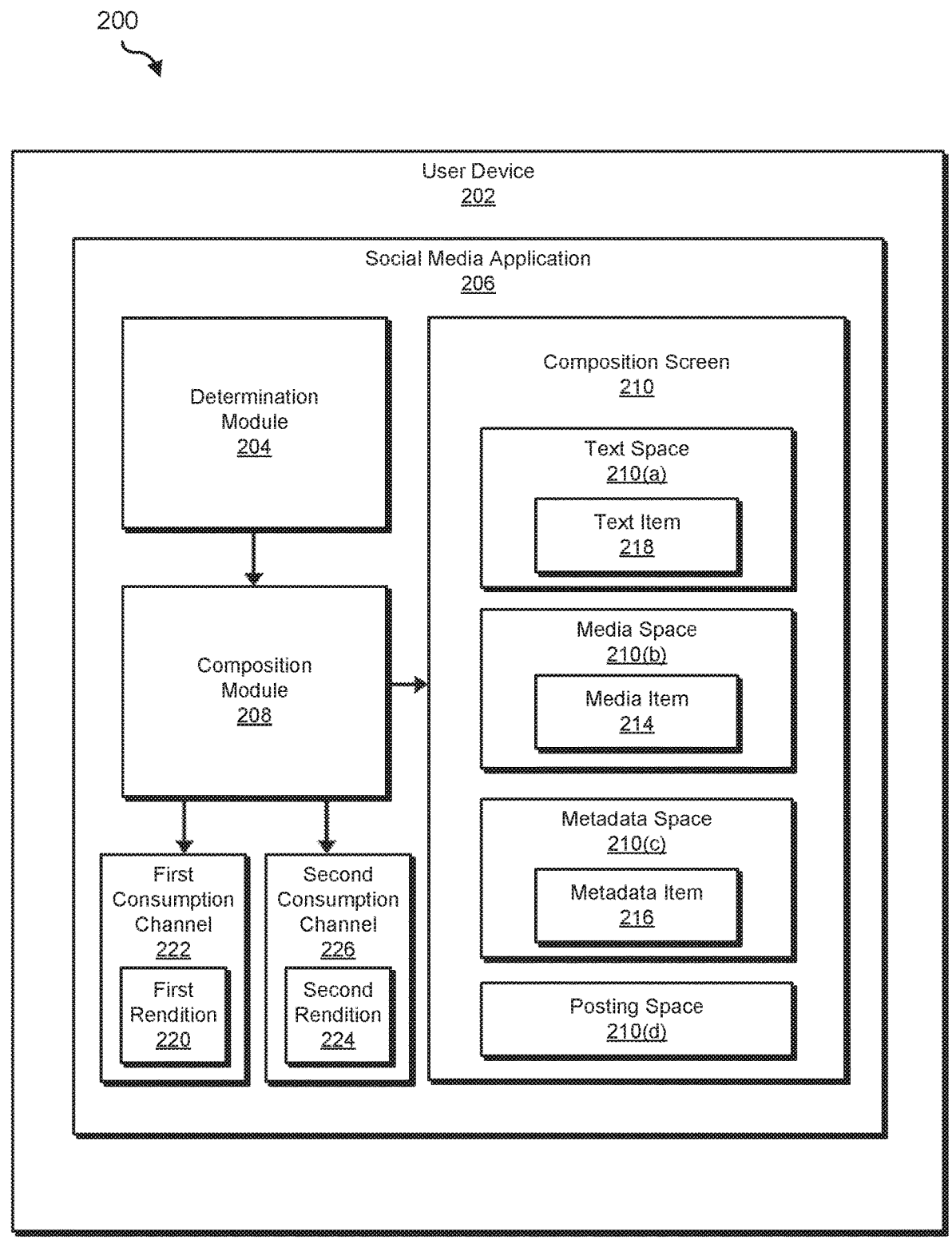
FIG. 2 is a block diagram of an exemplary system for creating different renditions of a same composition that was created using a single composer.

As illustrated in FIG. 1, at step 110, one or more of the systems described herein may determine, on a user device with at least one processor, that a user has opened a social media application that allows user compositions to be viewed using multiple different consumption channels. For example, as illustrated in FIG. 2, a determination module 204 may determine, on user device 202, that a user has opened a social media application 206.

User device 202 generally represents any type or form of computing device capable of reading computer-executable instructions. For example, user device 202 may represent a user device such as a smart phone and/or a tablet. Additional examples of user device 202 may include, without limitation, laptops, desktops with mobile elements, wearable devices, personal digital assistants (PDAs), etc. In some examples, a user of user device 202 may have a user account with a social-networking platform and may have a social media application managed by the social-networking platform and associated with the user's account (e.g., social media application 206) installed on user device 202.

Social media application 206 generally represents any type or form of computer program that may be installed and executed on user device 202 to cause user device 202 to perform useful tasks. In some examples, social media application 206 may represent a social media application managed by a social-networking platform. In these examples, social media application 206 may be used both to create social media compositions (e.g., using a composition process presented via one or more graphical user interfaces of social media application 206) and to view user compositions created by other users.

In some examples, the social-networking platform may allow users to create compositions that may be posted to multiple different consumption channels. For example, the social-networking platform may include (1) a newsfeed, which allows a user to scroll through a series of vertically arranged user compositions (e.g., posted by other users) and (2) a stories channel, in which compositions are displayed to the user in a slideshow format. In these examples, social media application 206 may allow users to create compositions that may be viewed in any of the variety of different consumption channels. For example, as will be described in greater detail below, social media application 206 may include a single digital composition flow that creates multiple renditions of a user-generated composition (e.g., one for each of the different consumption channels) based on a single composition.

Determination module 204 may determine that the user has opened social media application 206 in a variety of ways. In some embodiments, user input, which selects to open social media application 206, may be collected by one or more sensors embedded in user device 202. To give a specific example, user device 202 may represent a touchscreen device and determination module 204 may receive user input, which selects to open social media application 206, in response to a physical gesture being detected by sensors embedded in a touchscreen of user device 202 (e.g., at a position on the touchscreen corresponding to an icon of social media application 206 presented on a home screen of user device 202). Additionally or alternatively, user device 202 may be coupled to an auxiliary device, such as a computer mouse and/or a keyboard, and determination module 204 may receive user input, which selects to open social media application 206, in response to a physical gesture being detected by the auxiliary device.

Returning to FIG. 1, at step 120, one or more of the systems described herein may provide, on a display element of the user device, a composition screen configured to be used to create user compositions for use with any of the different consumption channels. For example, as illustrated in FIG. 2, a composition module 208 may provide a composition screen 210 that may be used to create compositions for multiple different consumption channels associated with social media application 206.

As used herein, the term "composition screen" generally refers to any type or form of computer-mediated user interface presented to a user engaged in a composition creation process. The composition screen described herein may be used to create a variety of renditions of the same composition, simplifying the digital composition process for end-users and reducing the computing resources stored and/or processed by computers associated with the social-networking platform. In one embodiment, the composition screen may represent an initial composition landing screen presented in response to receiving user input initiating a social composition process. In some examples, the composition screen may be used to create a newsfeed rendition of a composition for a newsfeed consumption channel and a story rendition of a composition for a stories consumption channel.

As used herein, the term "newsfeed consumption channel" generally refers to any type or form of social media consumption channel that presents a scrollable collection of newsfeed compositions. In some examples, a newsfeed may scroll (e.g., upward or downward) to reveal different compositions within the newsfeed, in response to receiving user scrolling input. In one example, the scrollable collection may include a collection of newsfeed compositions created by contacts of a particular user (e.g., friends of the particular user).

The term "newsfeed composition" as used herein generally refers to any type or form of composition that may be displayed in a newsfeed consumption channel. Newsfeed compositions may include, without limitation, text-based compositions, media-based compositions (which may include either a single media item or a collage of multiple media items), and/or a link to an online article.

As used herein, the term "stories consumption channel" generally refers to any type or form of social media consumption channel that presents a continuous series of story compositions to a composition-consumer, one by one. In one example, the stories consumption channel may transition from presenting one story composition to the next automatically, without requiring any user input to do so. In some examples, a story composition may only be viewable for a predetermined amount of time. For example, a story composition may be set to disappear after twenty-four hours.

The term "story composition" as used herein generally refers to any type or form of social media composition intended for a stories consumption channel. In some examples, a story composition may include a digital video. In other examples, a story composition may include a collection of digital media items. In these examples, the story composition may include a text-based cover card that is displayed for a predetermined amount of time followed by one or more digital media items (e.g., a digital photograph), each of which may be subsequently displayed for a subsequent predetermined amount of time.

Composition module 208 may present composition screen 210 in response to a variety of triggers. In some examples, composition module 208 may automatically present composition screen 210 as an initial welcome screen presented in response to determination module 204 determining that the user has opened social media application 206.

In other examples, a non-composition screen, such as a newsfeed screen, may be configured as the initial welcome screen, or a user may wish to transition from a non-composition screen, such as a newsfeed screen or a messenger screen, to a composition screen. In these examples, a predecessor screen may include a text box (e.g., with a prompt such as "What's on your mind?") and composition screen 210 may be retrieved when the text box is selected. Additionally or alternatively, the predecessor screen may include a composition icon which, when selected, triggers the retrieval of composition screen 210. In this example, the predecessor screen may include a variety of composition icons.

For example, FIG. 3A is an illustration of an exemplary predecessor screen 300 (a newsfeed screen in this example) with a composition icon 302(a) that depicts a glyph of a plus sign, conveying that the user may add a composition to his or her profile by selecting the composition icon. As another example, FIG. 3B is an illustration of exemplary predecessor screen 300 with a composition icon 302(b) that depicts a glyph of a pen and writing pad. As yet another example, FIG. 3C is an illustration of exemplary predecessor screen 300 with a composition icon 302(c) that includes a glyph of a camera.

In some examples, the systems and methods described herein may further include a glyph module that selects a glyph for a composition icon, to be displayed on a predecessor screen of a particular user account, based on user history. For example, the glyph module may determine that more than a threshold number and/or percentage of compositions posted by a particular user account are text-based compositions. In this example, the glyph module may select a composition icon with a text glyph, such as composition icon 302(b) illustrated in FIG. 3B, to be displayed on a predecessor screen of the particular user account.

As another example, the glyph module may determine that more than a threshold number and/or percentage of compositions posted by the particular user account are media-based compositions. In this example, the glyph module may select a composition icon with a camera glyph, such as composition icon 302(c), to be displayed on the predecessor screen of the particular user account.

Returning to FIG. 2, composition screen 210 may include multiple input spaces (each of which may receive user input). For example, composition screen 210 may include a text space 210(a), which enables the user to input text, a media space 210(b), which displays one or more media items that may be selected by a user, a metadata space 210(c), which displays one or more metadata items may be selected by the user, and/or a posting space 210(d), which the user may select when he or she is ready to post a social media composition created using composition screen 210.

Figure 4:
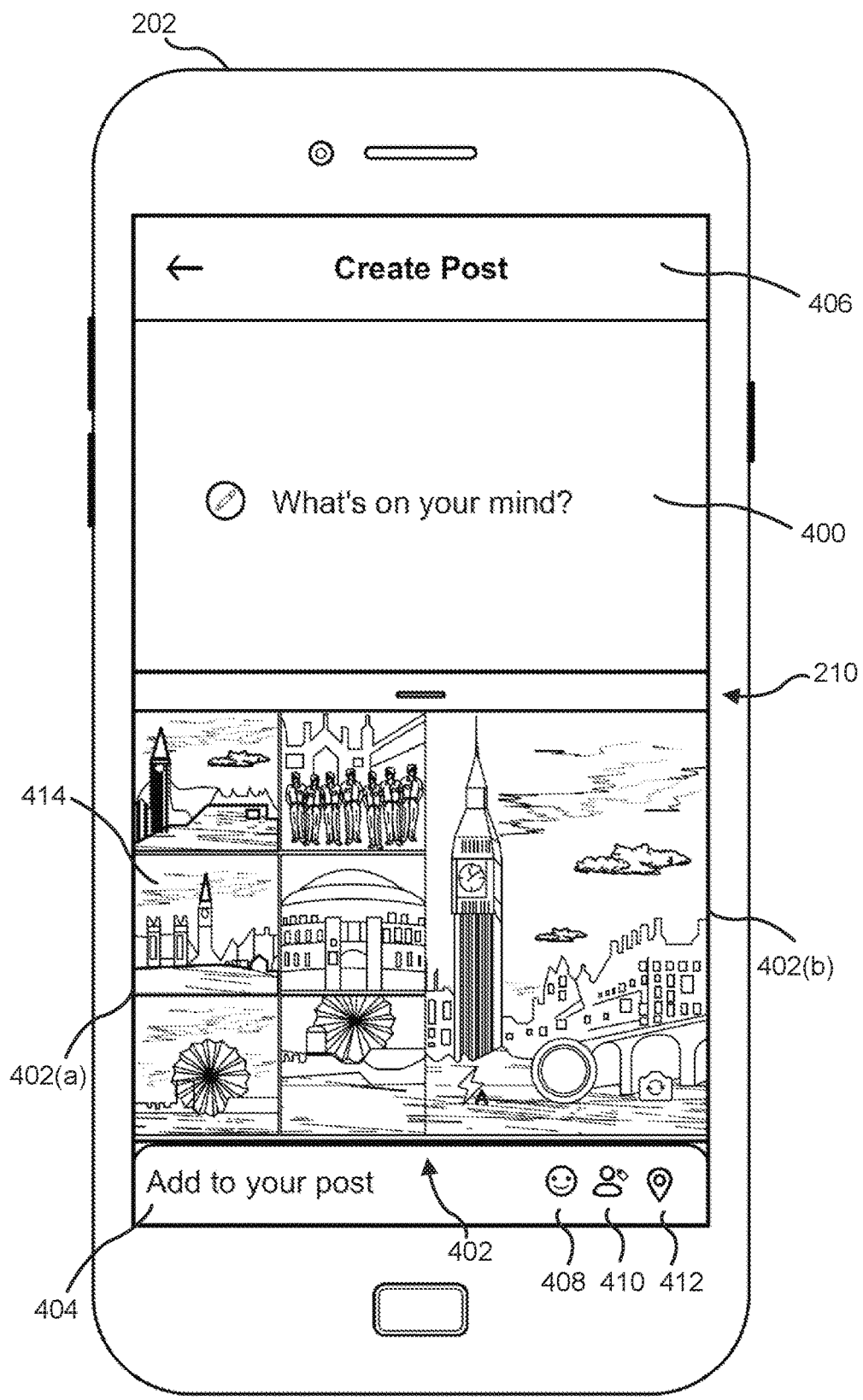
FIG. 4 is an illustration of an exemplary composition screen with vertically arranged content-submission spaces.

The input spaces of composition screen 210 may be arranged according to a variety of configurations. In some embodiments, the input spaces within composition screen 210 may be displayed as a series of vertically arranged layers, as depicted in FIG. 4. As illustrated in FIG. 4, the vertically arranged layers may include a text layer 400, a media layer 402 (including a stored media space 401(a) and a live camera space 402(b)), a metadata layer 404, and a posting layer 406. These vertical layers may be arranged in a variety of ascending orders. FIG. 4 illustrates posting layer 406 as the top layer, followed by text layer 400, followed by media layer 402, with metadata layer 404 as the bottom layer. However, the vertical layers may be arranged in any vertical order.

Figure 5:
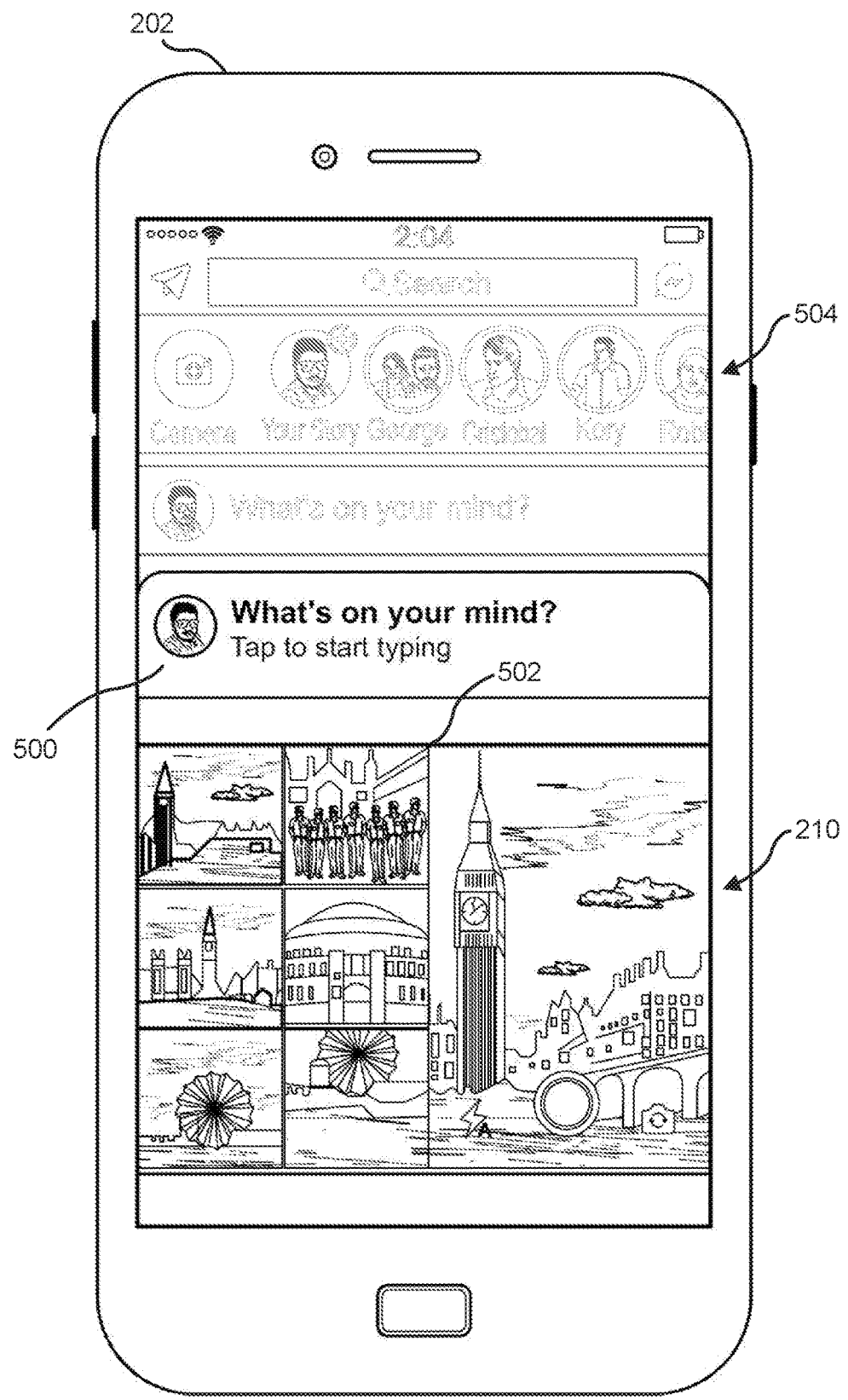
FIG. 5 is an illustration of an exemplary composition screen that hovers over a predecessor screen.

In additional or alternative embodiments, composition screen 210 may represent a partial screen that hovers above a predecessor screen. For example, FIG. 5 illustrates an embodiment of composition screen 210, which includes a text layer 500 positioned above a media layer 502, that hovers above a predecessor screen 504.

Figure 6:
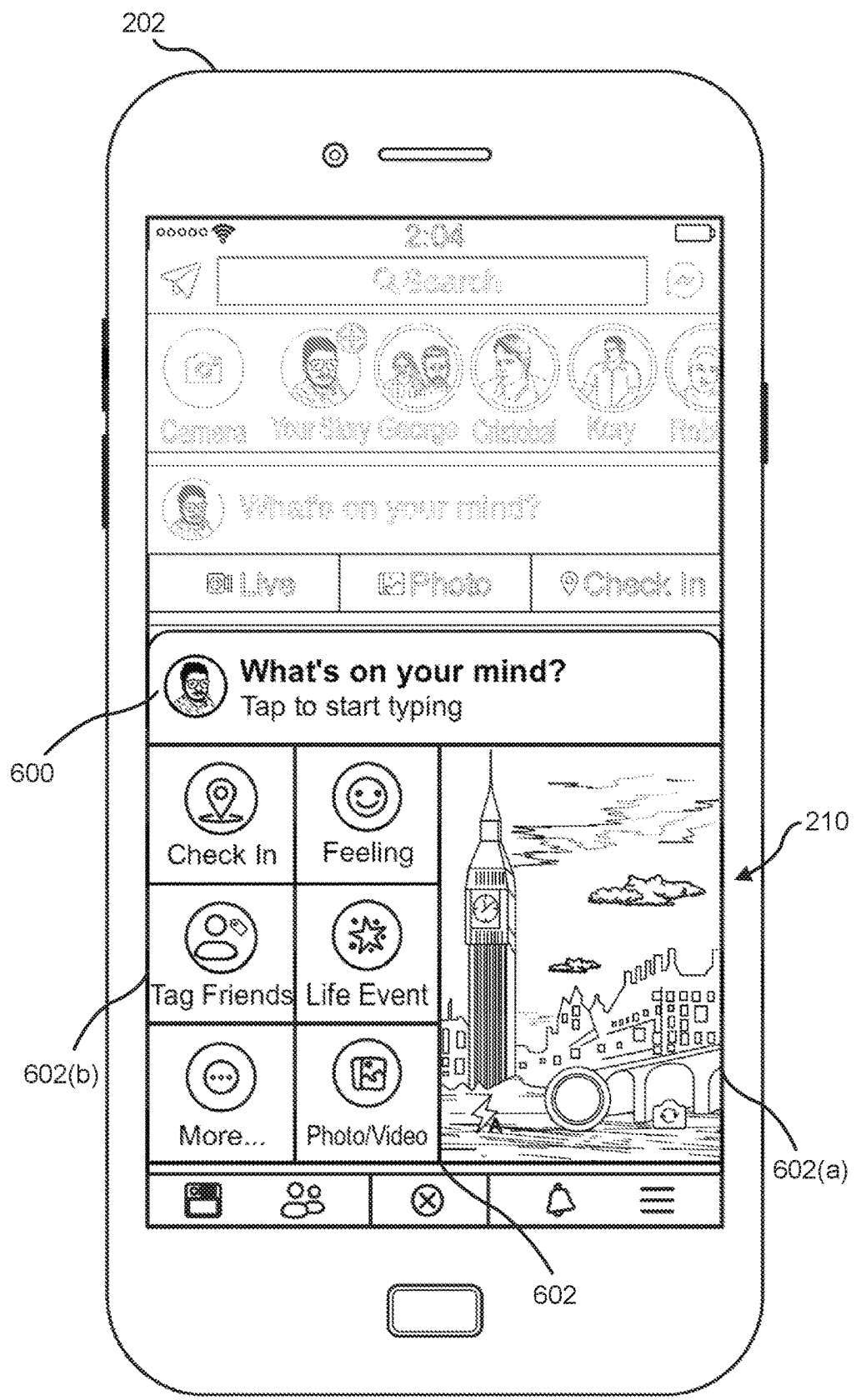
FIG. 6 is an illustration of an exemplary composition screen with vertically and horizontally arranged content-submission spaces.
Figure 7:
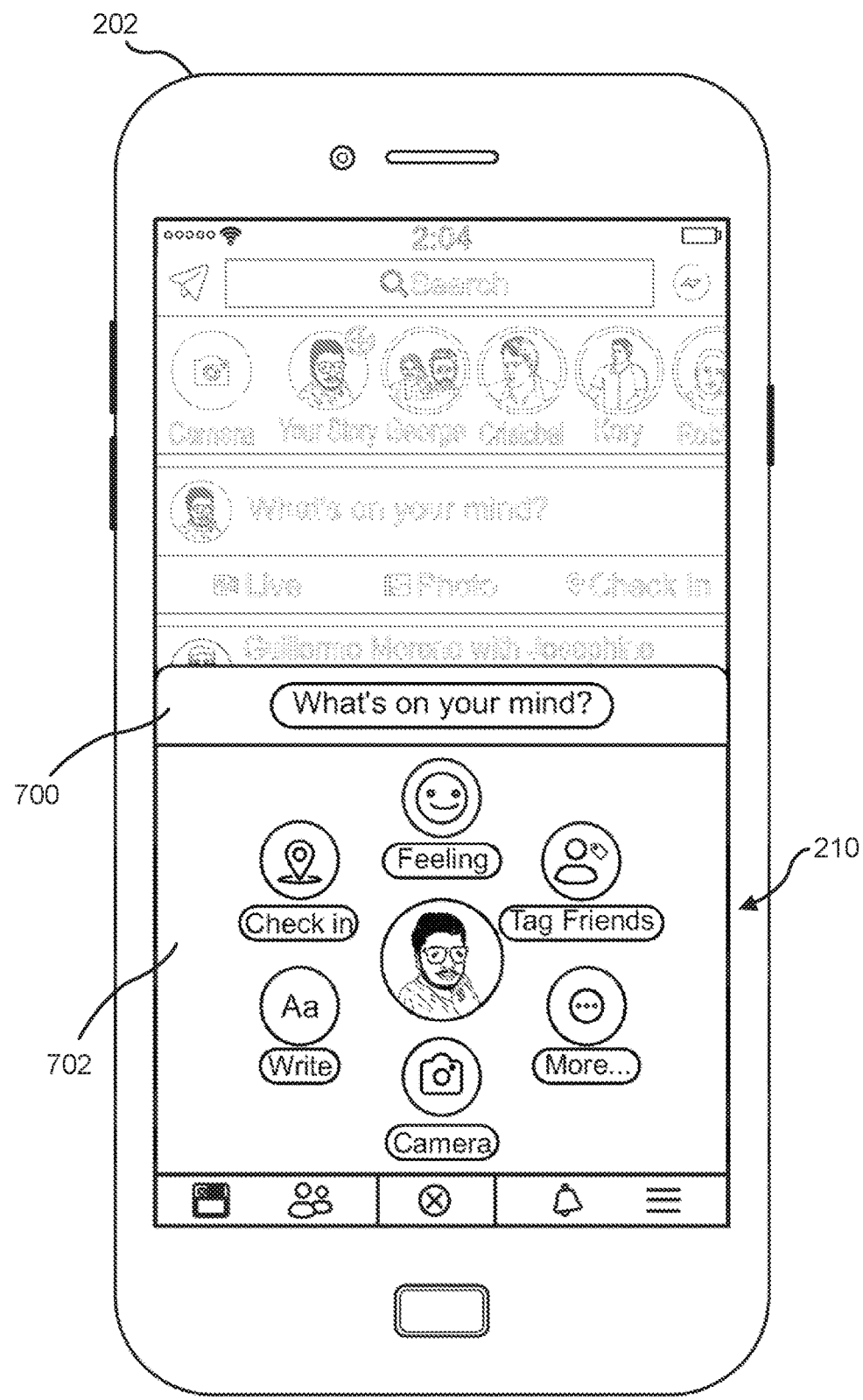
FIG. 7 is an illustration of an exemplary composition screen arranged in a circular configuration.

In some embodiments, composition screen 210 may include a combination of vertically and horizontally arranged input spaces. For example, FIG. 6 illustrates an embodiment of composition screen 210 in which a text layer 600 is positioned above a media-metadata composite layer 602, which includes a live camera space 602(a) positioned on the right-hand side of media-metadata composite layer 602 and metadata icons 602(b) positioned on the left-hand side of media-metadata composite layer 602. Additionally or alternatively, composition screen 210 may include multiple input spaces arranged in a circular configuration. For example, FIG. 7 illustrates an embodiment of composition screen 210 in which a text layer 700 is followed by a circular layer 702 in which a user avatar is surrounded by a ring of icons (i.e., a feeling icon, a location icon, a write icon, a camera icon, a friends icon, and a more icon), each corresponding to a different element of a composition that may be digitally manipulated by the user.

Each of the input spaces within composition screen 210 may be presented with a variety of configurations. Exemplary configuration for text space 210(a), media space 210(b), and metadata space 210(c) will each be discussed, in turn.

First, text space 210(a) may, in one embodiment, include a text box in which a user may submit text with a prompt to input text. For example, as illustrated in text layer 400 in FIG. 4, text space 201(a) may include the prompt "What's on your mind?" As another example, as illustrated in text layer 500 in FIG. 5, text space 201(a) may include the prompt "Tap to start typing." Additionally or alternatively, text space 210(a) may include a glyph (e.g., a glyph of a pen, a writing pad, and/or a typewriter) that indicates the text space 210(a) is configured for submitting text.

In some examples, a prompt and/or button displayed within text space 210(a) may vary based on user actions completed prior to accessing composition screen 210. For example, in one embodiment, composition module 208 may be configured to identify a copy action (e.g., most recently performed by a user prior to accessing composition screen 210).

In this embodiment, composition module 208 may display (1) a prompt in text space 210(a) to paste an object copied by the copy action and/or (2) a digital paste-button in text space 210(a) that, when selected via user input, pastes the object into text space 210(a). For example, composition module 208 may determine that a user, prior to accessing composition screen 210, copied a particular link and, in response to the determination, may present a prompt in text space 210(a) with the text "Paste copied link here?" and/or may present a digital paste-button that, when selected, pastes the copied link into text space 210(a). In another example, composition module 208 may determine that a user, prior to accessing composition screen 210, copied a media item (e.g., a movie trailer) and/or a link to a webpage that includes the media item. In this example, composition module 208 may, in response to the determination, provide, in text space 210(a), a prompt to paste the media item and/or a digital paste-button that pastes the media item into text space 210(a) when the digital paste-button is selected via user input.

Next, in some examples, media space 210(b) may present multiple media items (such as media item 214 in FIG. 2) that may be selected via media space 210(b) for inclusion in a social media composition. Media space 210(b) may present a variety of types of media items, including, without limitation, digital photographs, digital videos, digital graphics (e.g., Graphics Interchange Format (GIF) files), etc.

In one example, media space 210(b) may present a group of media items that are stored by user device 202, each of which may be selected via user input for inclusion in a social media composition. For example, as illustrated in FIG. 4, media space 210(b) (illustrated in FIG. 4 as media layer 402) may include a group of one or more stored media items, which are stored by user device 202, in stored media space 402(a). In one example, the group of media items may represent digital photographs and/or digital videos from a camera roll database of user device 202. In this example, the media items may represent a subset of the digital photographs and/or digital videos maintained by the camera roll database that were most recently added to the camera roll, most recently shared via user device 202 (e.g., via a previous social media composition, a social media message, an email, and/or a text), and/or most recently designated via user input as a preferred media item.

In examples in which a subset of camera roll photographs and/or videos are displayed in media space 210(b), the user may expand media space 210(b) to display a remaining portion of camera roll photos and/or videos. Using FIG. 8 as a specific example, a user may select an expansion bar 800 and scroll upward (e.g., in the direction of arrow 801) to reveal a full media screen 802 with an expanded set of media items from a camera roll of user device 202.

In some examples, media space 210(b) may further include a live camera space, such as live camera space 402(b) illustrated in FIG. 4, from which a new media item may be generated. In these examples, a user may capture a digital photograph and/or digital video of a live event to include in a social media composition using the same screen (i.e., the composition screen) used to submit text, previously captured photos and/or videos, and metadata.

Finally, metadata space 210(c) may, in some examples, include a variety of buttons that depict different types of metadata that may be added to a social media composition. Using FIG. 4 as a specific example, metadata layer 404 may include a feelings button 408, a friends button 410, and a location button 412.

Returning to FIG. 1, at step 130, one or more of the systems described herein may collect user-selected content items from the composition screen. For example, the systems may collect (1) one or more media items submitted via the composition screen, (2) text submitted via the composition screen, and/or (3) one or more metadata items submitted via the composition screen. For example, as illustrated in FIG. 2, composition module 208 may collect a text item 212 from text space 210(a), media item 214 from media space 210(b), and/or a metadata item 216 from metadata space 210(c).

Composition module 208 may collect the content items in a variety of ways. In examples in which text space 210(a) includes a text box in which a user may input text, composition module 208 may collect the text inputted by the user into the text box. In examples in which media space 210(b) displays media items stored by user device 202, composition module 208 may collect media items selected via user input from among those displayed. In examples in which media space 210(b) displays a live video space, composition module 208 may collect a live video recorded by the user using the light video space. Finally, in examples in which metadata space 210(c) includes metadata items, composition module 208 may collect the metadata items selected via user input.

Figure 9:
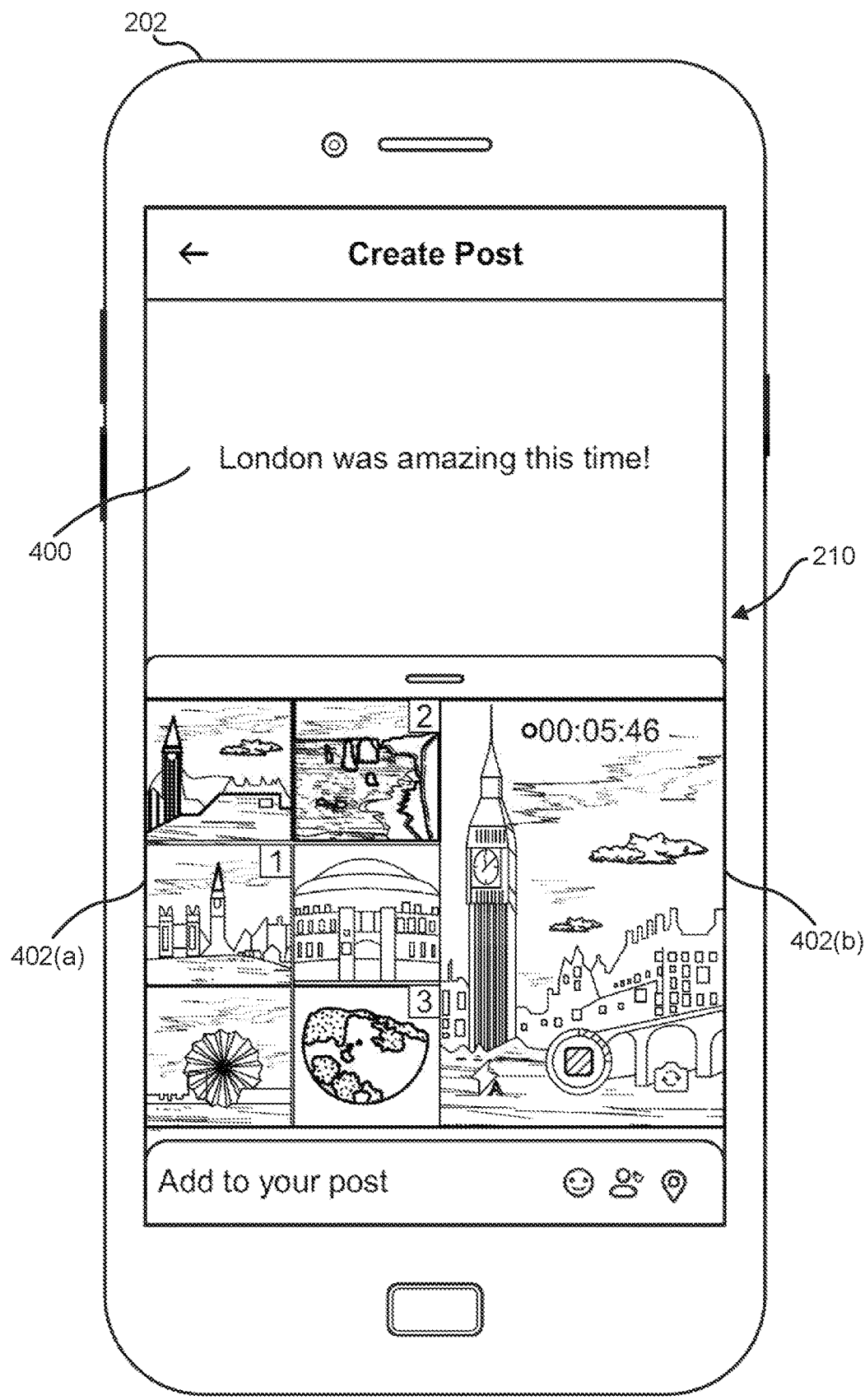
FIG. 9 is an illustration of the exemplary composition screen of FIG. 4 populated with exemplary user content.
Figure 10C:
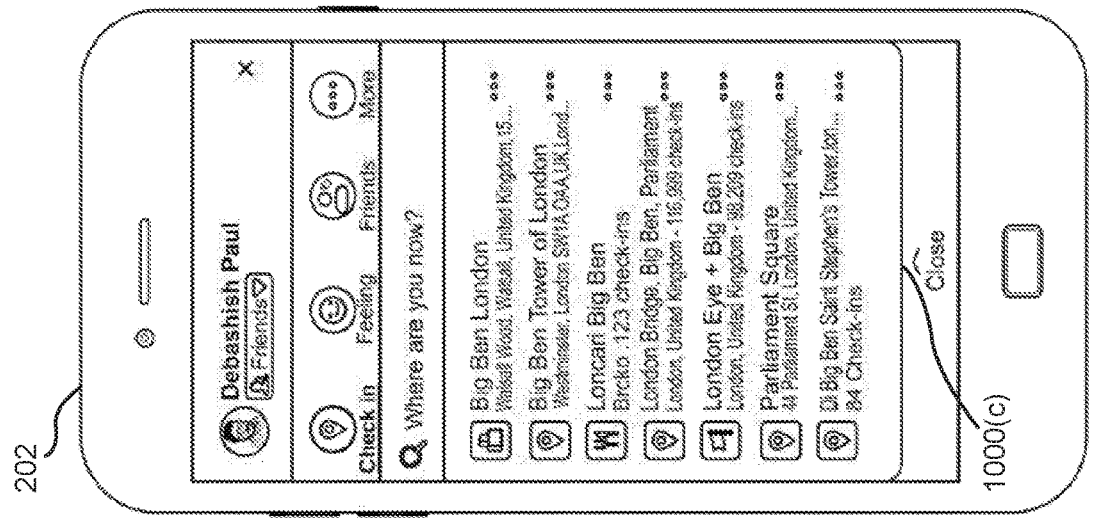
FIG. 10C is an illustration of an exemplary location metadata screen.
Figure 10B:
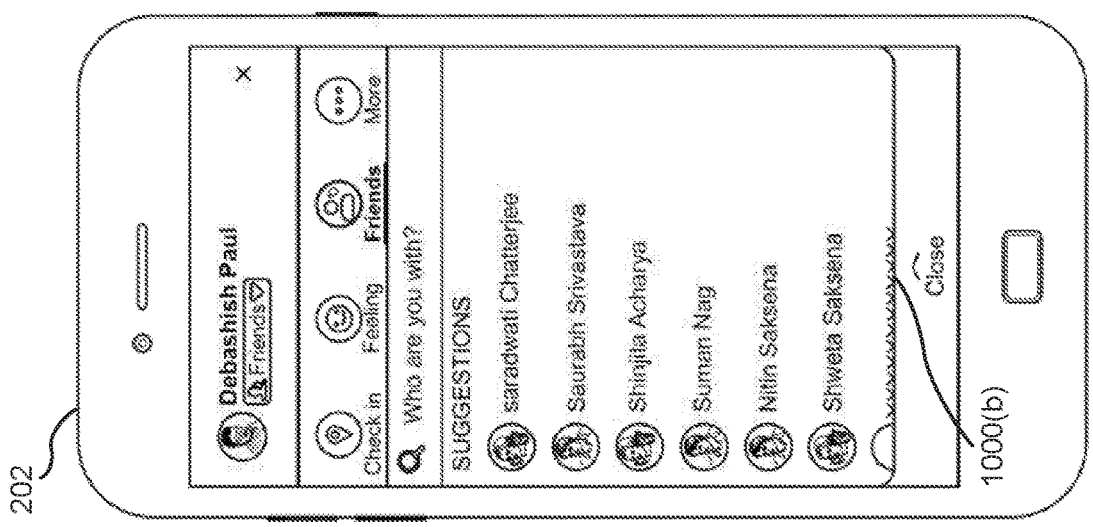
FIG. 10B is an illustration of an exemplary friends metadata screen.
Figure 10A:
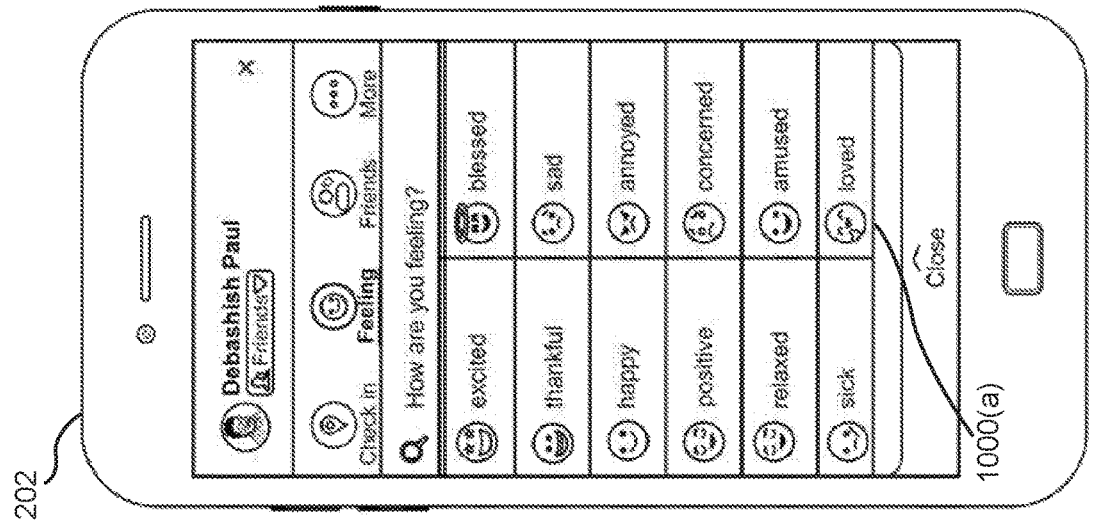
FIG. 10A is an illustration of an exemplary feelings metadata screen.
Figure 12:
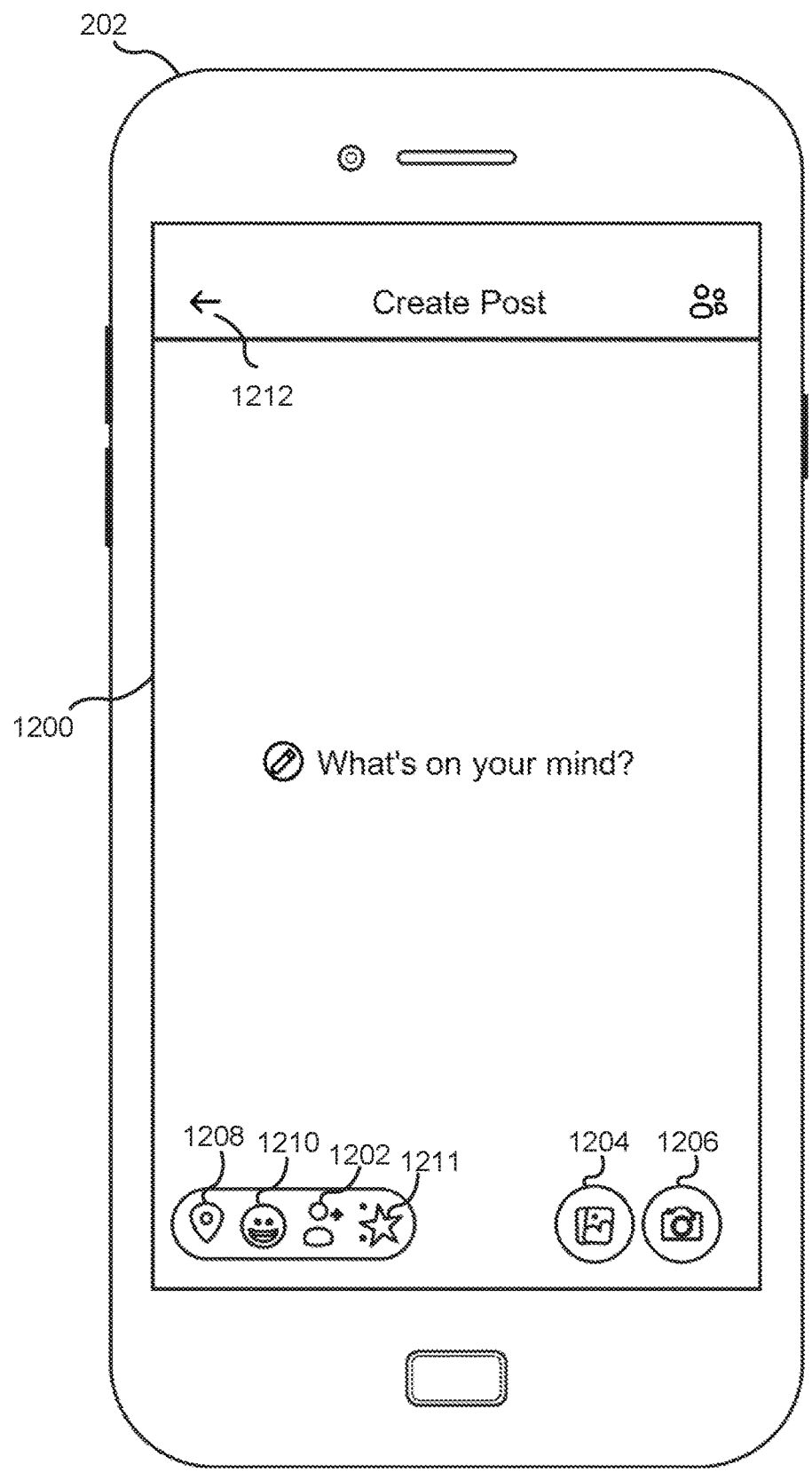
FIG. 12 is an illustration of an exemplary text creation screen.

In some examples, composition module 208 may collect all of the user-generated content (e.g., text content and media content) from a single screen (e.g., composition screen 210). For example, FIG. 9 depicts an exemplary embodiment of composition screen 210, corresponding to the embodiment of composition screen 210 illustrated in FIG. 4, populated with user content collected via user input. As illustrated in FIG. 9, composition module 208 may collect, via composition screen 210, (1) three digital photographs from stored media space 402(a), (2) a live video captured using live camera space 402(b), and (3) the text "London was amazing this time!" from a text box in text layer 400.

In one embodiment, composition screen 210 may further receive metadata inputs from a user (i.e., without requiring the user to toggle to an additional metadata screen). In alternative embodiments, composition screen 210 may include user-selectable elements that, in response to being selected, navigate to an additional metadata screen. Using FIGS. 4 and 10A-10C to provide several specific examples, (1) feelings button 408 illustrated in FIG. 4 may, when selected, navigate to an additional feelings screen 1000(a) illustrated in FIG. 10A, (2) friends button 410 illustrated in FIG. 4 may, when selected, navigate to an additional friends screen 1000(b) illustrated in FIG. 10B, and (3) location button 412 illustrated in FIG. 4 may, when selected, navigate to an additional location screen 1000(c) illustrated in FIG. 10C. In these examples, composition module 208 may collect metadata content submitted by the user via the additional metadata screens.

Figure 8:
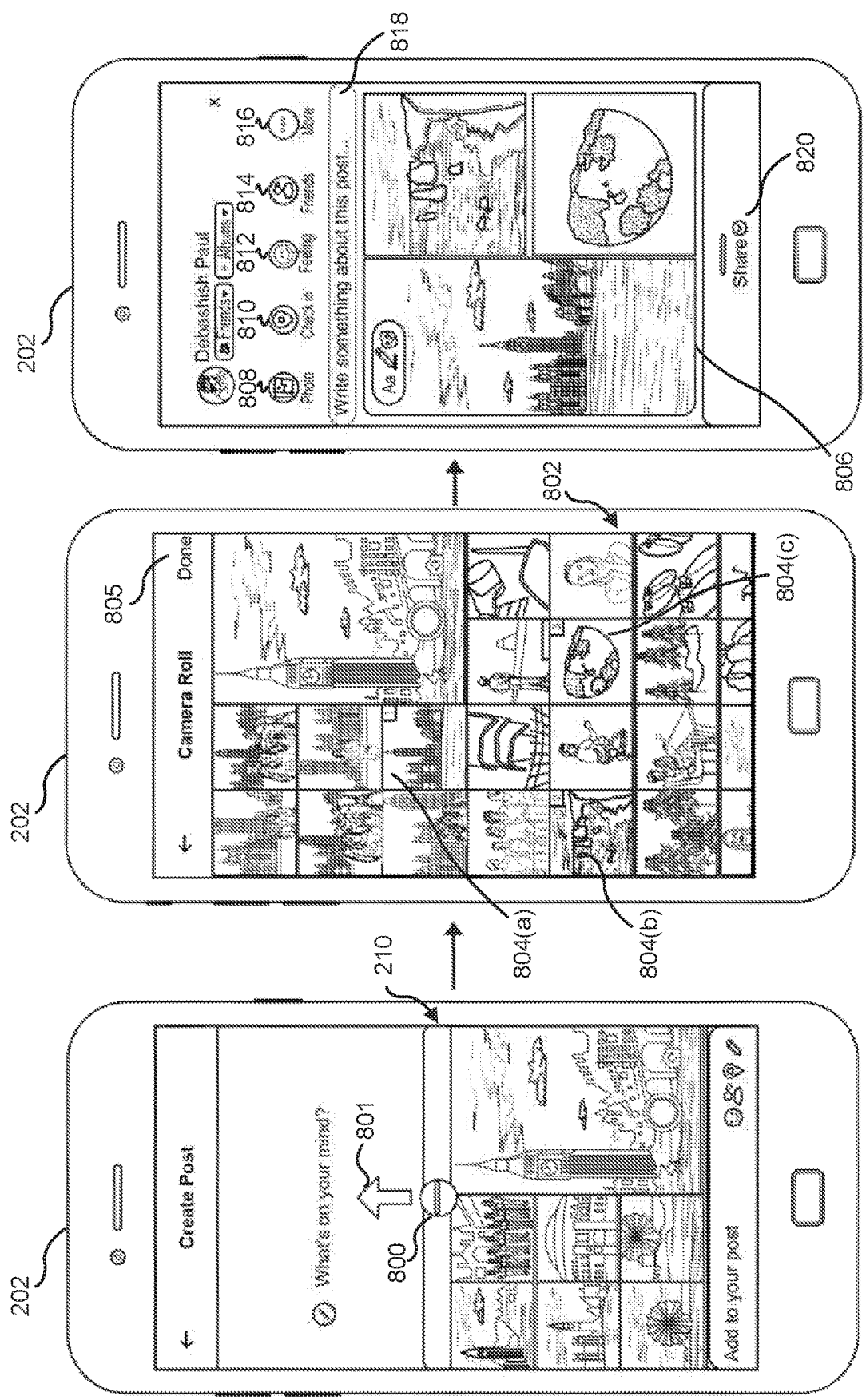
FIGS. 8A-8C are an illustration of an exemplary media-expansion flow.

In other alternative embodiments, composition screen 210 may allow the user to initiate his or her composition using any type of initial input (e.g., by entering text, selecting a media input, or selecting a media-expansion button such as expansion bar 800 in FIG. 8), but one or more additional screens may be presented once the user has submitted the initial input. The content of the additional screen may depend on the type of initial input. For example, as described above in connection with FIG. 8B, a full screen with an expanded set of media items may be presented in response to receiving user input selecting an expansion element, such as expansion bar 800 in FIG. 8A.

In some examples, composition module 208 may determine, based on an initial content selection and/or submission, that the user is attempting to create either a text-based composition or a media-based composition. For example, composition module 208 may receive user input selecting one or more media items from one or more of the media sources (e.g., either from one of the media items displayed on composition screen 210 or from one of the media items displayed on full media screen 802 in FIG. 8B). In response, composition module 208 may automatically navigate to an additional media-composition screen that displays the selected media items.

Using FIGS. 8B and 8C as a specific example, composition module 208 may detect user input selecting digital photographs 804(a), 804(b), and 804(c) from full media screen 802 illustrated in FIG. 8B. In response, composition module 208 may navigate to post-selection screen 806 illustrated in FIG. 8C, which displays the three selected media items and presents various digital buttons corresponding to specific user actions that may be selected by the user (e.g., an additional photos button 808, a location button 810, a feelings button 812, a friends button 814, a more button 816, a text box 818, and a share button 820).

In some examples, composition module 208 may navigate to the additional media-composition screen in response to receiving explicit user input (e.g., in response to receiving user input selecting a button with the text "done" or "next," such as done button 805 illustrated in FIG. 8B. In other examples, composition module 208 may operate in accordance with a single-media policy based on a prediction that the user intends to use a media item as the basis of a single-media composition. The single-media policy may instruct composition module 208 to automatically navigate to an additional media-composition screen in response to receiving user input selecting a first media item. The additional media-composition screen may display a full screen display of the first media item and superimpose, over the first media item, digital buttons associated with various user actions that may be selected by the user.

Using FIGS. 4 and 11A-11B as a specific example of a single-media creation flow, composition module 208 may receive user input selecting photograph 414 from stored media space 402 in FIG. 4. In response to receiving the user input, composition module 208 may automatically retrieve and display an additional media-based composition screen 1100 illustrated in FIG. 11A. As shown in FIG. 11A, additional media-based composition screen 1100 may include a full screen view of photograph 414 with a text digital button 1102 (which allows the user to add text to the composition), a metadata digital button 1104 (which allows the user to add metadata items to the composition), a save digital button 1106 (which allows the user to save the composition for future editing), an additional-media button 1108 (which allows the user to add additional media items to the composition, reversing the single-media presumption), and a continuation button 1110 (which allows the user to continue to a subsequent additional composition screen, such as subsequent additional composition screen 1112 shown in FIG. 11B).

In some examples, additional media-based composition screen 1100 may also include a newsfeed button 1114 (which allows the user to add the composition to a newsfeed) and/or a story button 1116 (which allows the user to add the composition to a story). Similarly, subsequent additional composition screen 1112 may allow the user to select a stories consumption channel, a newsfeed consumption channel, and/or both consumption channels for posting the social media composition. As will be described in greater detail below, the disclosed systems and methods may create different renderings of the same social media composition depending on whether the intended consumption channel is a newsfeed consumption channel and/or a stories consumption channel.

In additional or alternative examples, composition module 208 may receive an initial user input selecting a text box within text space 210(*a*) of composition screen 210. In response, composition module 208 may automatically navigate to an additional text-based composition screen. Using FIGS. 4 and 12 as a specific example, composition module 208 may determine that the user is attempting to create a text-based composition based on a detection that text layer 400 has been touched via a touchscreen and/or has been selected via a cursor corresponding to an auxiliary device. In response to this determination, composition module 208 may automatically retrieve and display an additional text-based composition screen 1200 illustrated in FIG. 12.

Additional text-based composition screen 1200 may also include a variety of digital buttons: a friends button 1202 (to add friends), a media button 1204 (to add stored media items), a camera button 1206 (to navigate to a live camera screen), a location button 1208 (to add location metadata), a feelings button 1210 (to add feelings metadata), an inspiration button 1211 (to view social media inspirational content), and a posting button 1212 (to post the social media composition on the social-networking platform). In some examples, as illustrated by additional text-based composition screen 1200, the additional text-based composition screen may facilitate creating a plain-text composition. In other examples, additional text-based composition screen 1200 may facilitate creating a Super Awesome Text Post (SATP). In these examples, additional text-based composition screen 1200 may provide various backgrounds which may be selected to display behind the user-generated text and various colors, fonts, and/or sizes that may be selected for the user-generated text.

Returning to FIG. 1, at step 140, one or more of the systems described herein may, in response to collecting the user-selected content, create (1) a first user composition to be viewed from a first consumption channel and/or (2) a second user composition to be viewed from a second consumption channel, each of which is based on the user-selected elements. For example, as illustrated in FIG. 2, a composition module 208 may create (1) a first rendition 220 of a user composition for a first consumption channel 222 and (2) a second rendition 224 of the user composition for a second consumption channel 226.

First rendition 220 may include one or more features that differ from the features of second rendition 224. These features may coincide with one or more features of first consumption channel 222. Similarly, second rendition 224 may include one or more features that differ from the features of first rendition 220 and that coincide with one or more features of second consumption channel 226. The features of first rendition 220 may differ from the features of second rendition 224 in a variety of ways. For example, a media format of first rendition 220 may differ from a media format of second rendition 224. In one such example, first rendition 220 may be displayed in a slideshow format (e.g., intended for a stories consumption channel) and second rendition 224 may be displayed in a collage format (e.g., intended for a newsfeed consumption format).

Using FIGS. 8B, 8C, 13, and 14 as a specific example of renditions that differ in media format, composition module 208 may have collected digital photographs 804(*a*), 804(*b*), and 804(*c*) from full media screen 802 in FIG. 8B, as discussed above in connection with step 130. In response, composition module 208 may have generated post-selection screen 806, illustrated in FIG. 8C, which includes the media items selected by the user. Then, composition module 208 may have collected, from text box 818 in FIG. 8C, the text "London was amazing this time!"

Figure 13B:
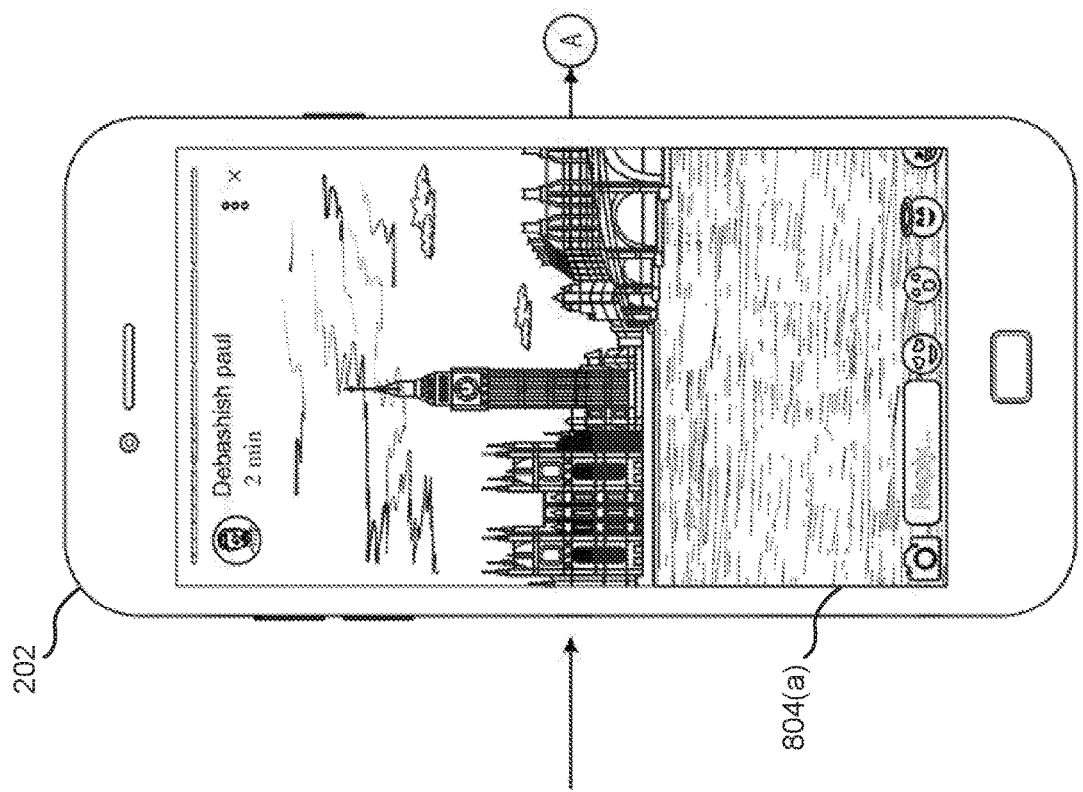
Figure 13A:
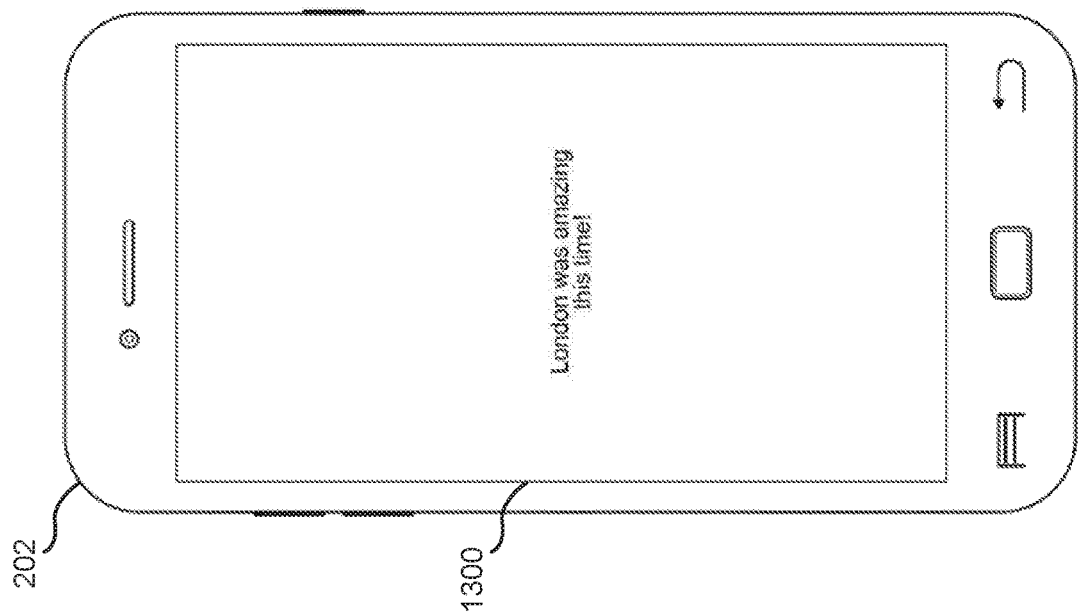
Figure 14:
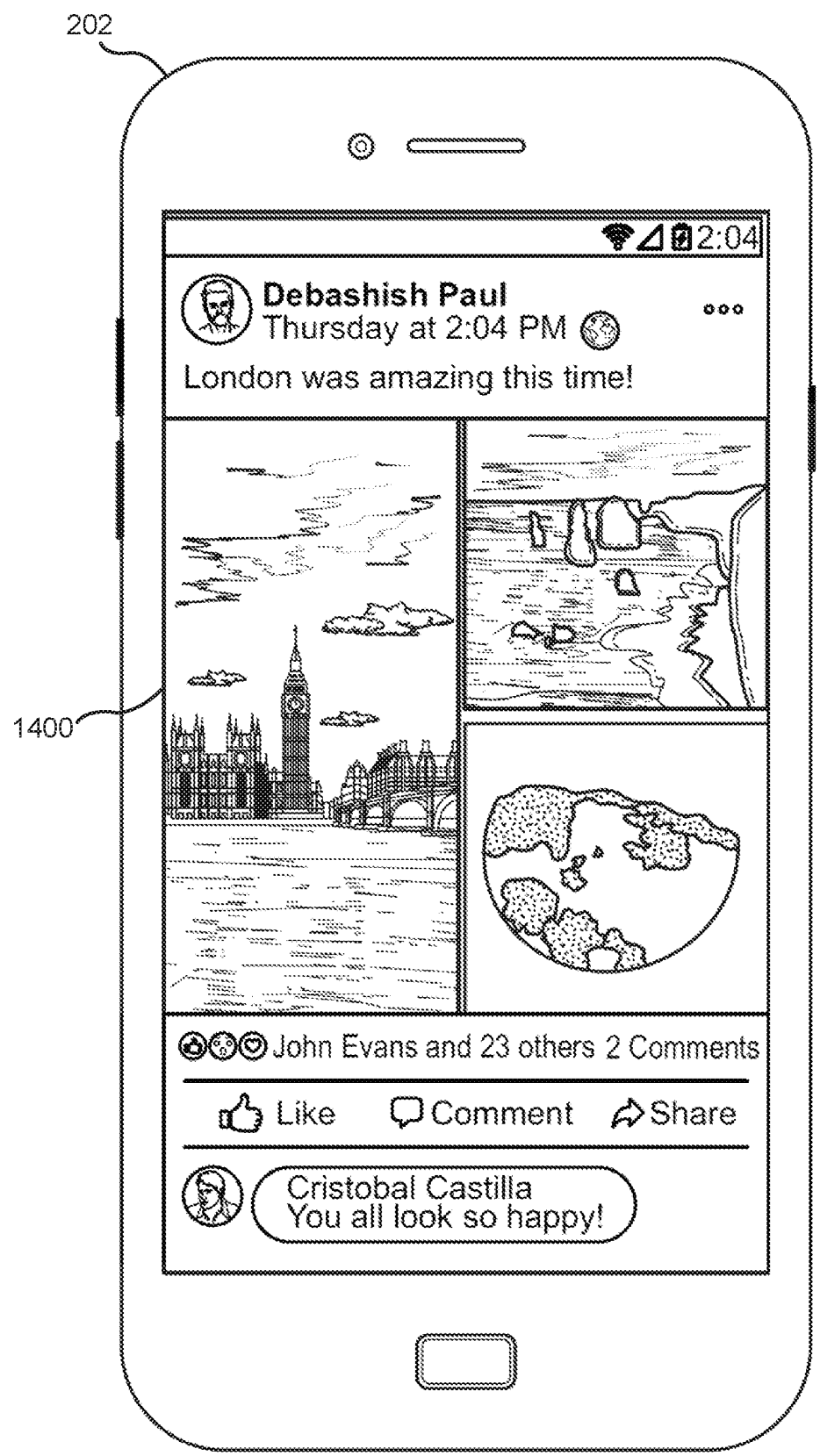
FIG. 14 is an illustration of a second rendition of a user composition, based on the user content illustrated in FIG. 9, intended for a newsfeed consumption channel.

In this specific example, FIGS. 13A-13D illustrate an exemplary embodiment of first rendition 220, created by composition module 208 for a stories consumption channel, and FIG. 14 illustrates an exemplary embodiment of second rendition 224, created by composition module 208 fora newsfeed consumption channel, each of which includes the submitted content illustrated in FIGS. 8B and 8C but that differ from one another in media format.

As shown in FIGS. 13A-13D, first rendition 220 may include a cover page that includes the text "London was amazing this time!" (as illustrated by cover page 1300 in FIG. 13A), followed by a slideshow displaying digital photograph 804(*a*) for a predetermined amount of time (as illustrated in FIG. 13B), followed by digital photograph 804(*b*) for a subsequent predetermined amount of time (as illustrated in FIG. 13C), followed by digital photograph 804(*c*) displayed for another subsequent predetermined amount of time (as illustrated in FIG. 13D). Then, as shown in FIG. 14, second rendition 224 may include a static collage including digital photographs 804(*a*), 804(*b*), and 804(*c*) with a caption that includes the text "London was amazing this time!" as illustrated by newsfeed composition 1400.

As another example of features that may differ between first rendition 220 and second rendition 224, a metadata format of first rendition 220 may differ from a metadata format of second rendition 224. For example, first rendition 220 may include metadata information in plain text (e.g., as part of a caption and/or a title) and second rendition 224 may include the same metadata information in the form of one or more digital stickers superimposed onto one or more media items displayed in the composition.

Figure 15B:
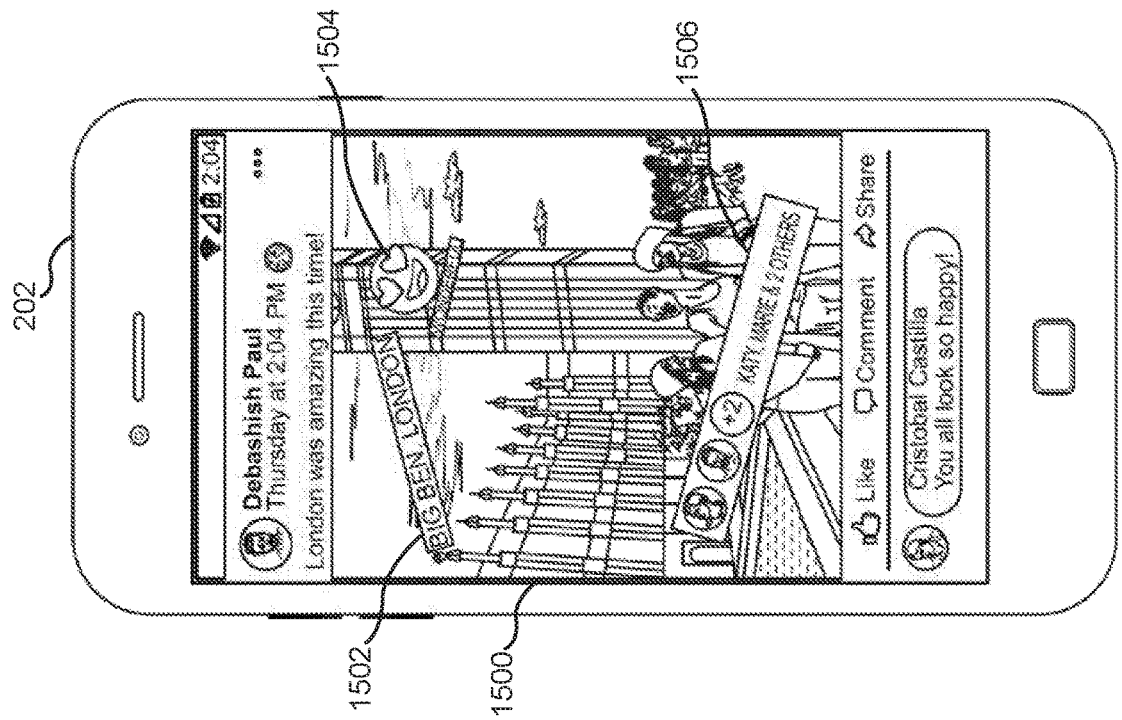
FIG. 15B is an illustration of an exemplary newsfeed composition in which metadata is displayed in a digital sticker format.
Figure 15A:
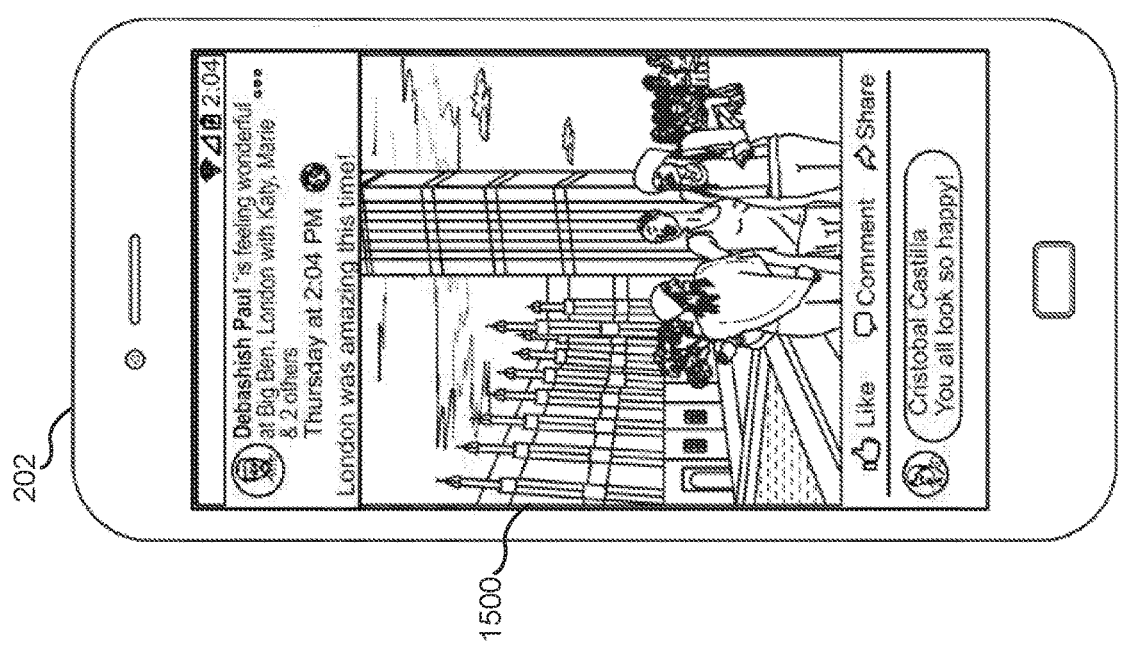
FIG. 15A is an illustration of an exemplary newsfeed composition in which metadata is displayed in plain text.

To provide a specific example, FIG. 15A illustrates an exemplary embodiment of first rendition 220 in which metadata information is included in plain text. As shown in FIG. 15A, a social media composition 1500 may include a digital photograph with the title "Debashish Paul is feeling wonderful at Big Ben, London with Katie, Marie & 2 others" and the caption "London was amazing this time!" Continuing with the specific example, FIG. 15B illustrates an exemplary embodiment of second rendition 224 in which metadata information is included in digital stickers. As shown in FIG. 15B, an alternate rendition of social media composition 1500 may include a location sticker 1502, which indicates "Big Ben, London" as a location, a feelings sticker 1504, which indicates that the author of the composition is feeling wonderful, and a friends sticker 1506, which tags Katie, Marie, and two others.

In this specific example, composition module 208 may have collected, from composition screen 210, a user selection of location sticker 1502, feelings sticker 1504, and friends sticker 1506, along with the placement of these sticker items within the social media composition. Then, composition module 208 may have (1) created first rendition 220 by placing the digital stickers selected by the user in the locations selected by the user and/or (2) created second rendition 224 by extracting the location, feelings, and friends information from the digital stickers selected by the user and including the extracted text in second rendition 224 in a plain text format. By extracting this information from digital sticker selections (as opposed to requiring users to (1) submit a digital sticker selection for a rendition that displays metadata information in a digital sticker format and to (2) submit plain text for a rendition that displays metadata information in a plain text format), the disclosed systems and methods may utilize a single composer to create both compositions that include metadata information in a digital sticker format and compositions that include metadata information in a plain text format.

In some examples, composition module 208 may automatically extract information from a digital sticker and convert the extracted information into a plain text composition element when creating a rendition for certain consumption channels (e.g., when creating a rendition for a newsfeed consumption channel). Alternatively, composition module 208 may automatically convert information from plain text into a digital sticker for certain renditions. For example, composition module 208 may automatically convert text submitted to a text box included within text space 210(*a*) into a digital text sticker and superimpose the digital text sticker over one or more media items (e.g., when creating a rendition for a stories consumption channel).

Figure 16A:
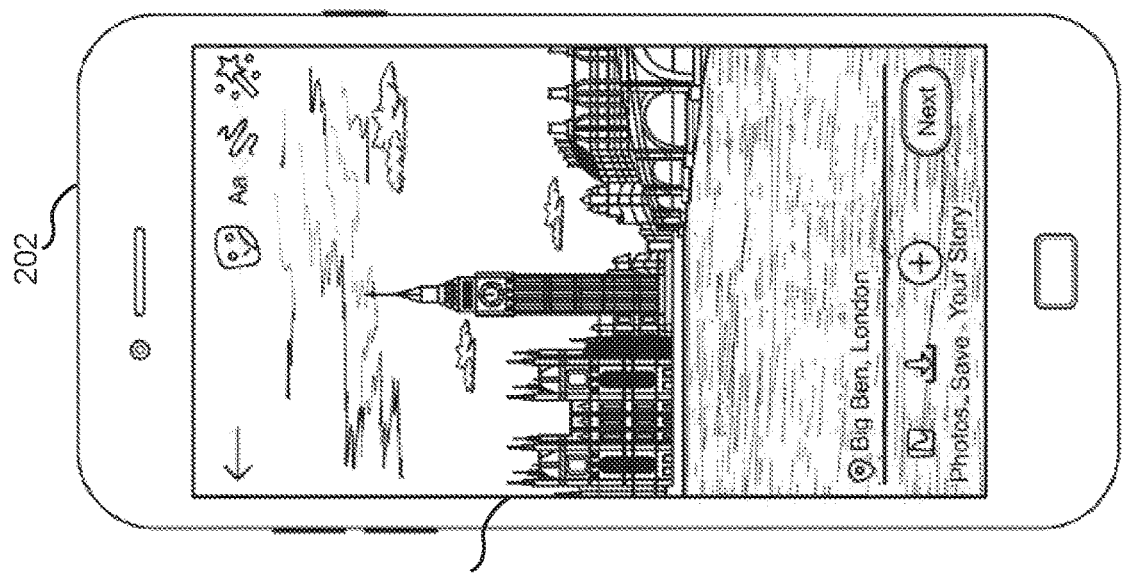
FIGS. 16A-16B are an illustration of an exemplary composition screen for placing location metadata and/or selecting a format for location metadata.
Figure 16B:
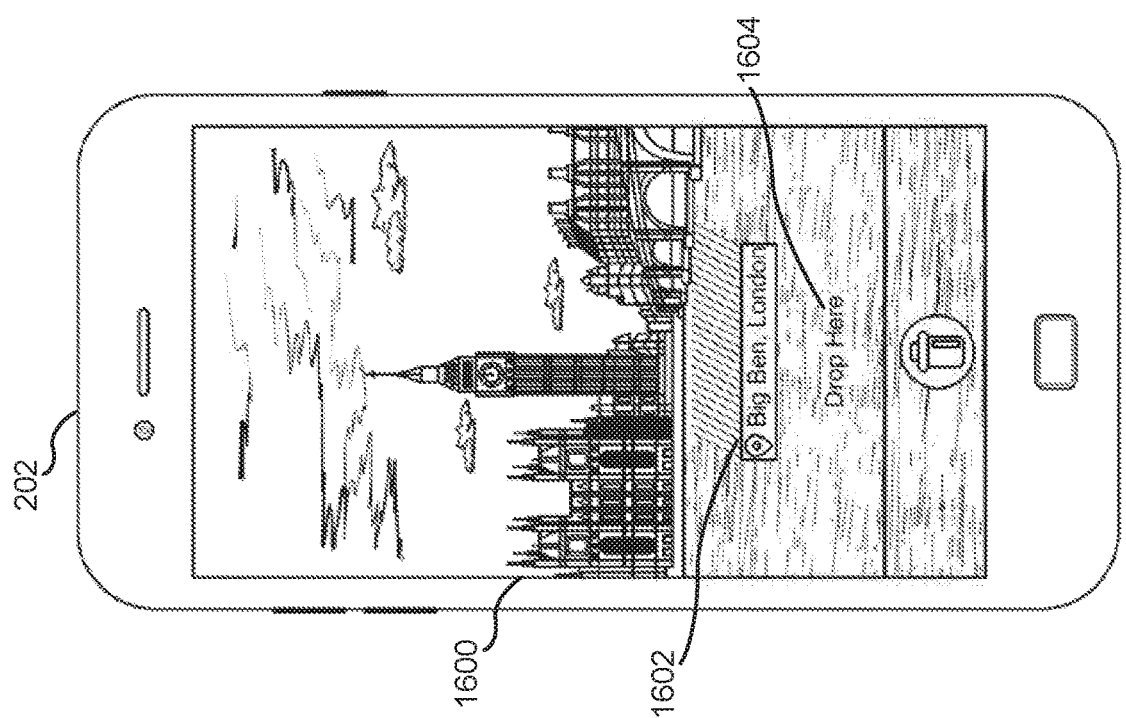

In other examples, composition module 208 may determine whether to use a digital sticker format and/or a plain text format for a rendition based on user input. Using FIGS. 16A and 16B as a specific example, composition module 208 may have presented a composition screen 1600 to a user that allows the user to drag-and-drop a digital location sticker 1602 to a desired location. In this example, composition module 208 may convert digital location sticker 1602 to plain text, as shown in FIG. 16B, if the user drags and drops digital location sticker 1602 into a designated area 1604 (e.g., which includes the prompt "drop here"). Otherwise, if the user drags and drops digital location sticker 1602 into any other area within composition screen 1600, composition module 208 may position digital location sticker 1602 (in its digital sticker format) at the location where digital location sticker 1602 is dropped.

In some examples, both first rendition 220 and second rendition 224 may include digital stickers. However, each may include a different version of the digital stickers. For example, first rendition 220 may be intended for a newsfeed consumption channel that truncates social media compositions within a newsfeed (e.g., expanding a social media composition only if a user consuming a newsfeed taps on the social media composition from within the newsfeed to view the social media composition in full-screen mode). Second rendition 224, by contrast, may be intended for a stories consumption channel that only displays social media compositions in full-screen mode. In this example, first rendition 220 and second rendition 224 may both include digital stickers selected via composition screen 210, but first rendition 220 may display a truncated version of the selected digital stickers and/or may change a placement of the digital stickers to accommodate the truncated nature of the newsfeed consumption channel.

As another example of features that may differ between first rendition 220 and second rendition 224, a text format of first rendition 220 may differ from a text format of second rendition 224. For example, the text of first rendition 220 may be presented in plain text, while the text of second rendition 224 may be presented in a Super Awesome Text Post (SATP) format. In some examples, composition module 208 may automatically select a text format for a rendition based on the rendition's intended consumption channel. In other examples, composition module 208 may select a text format based on a user selection received from user input (e.g., to composition screen 210).

In some examples, composition module 208 may automatically create both first rendition 220 and second rendition 224. In other examples, composition module 208 may determine which renditions to create based on user input selecting first consumption channel 222, second consumption channel 226, or both consumption channels.

After creating first rendition 220 and/or second rendition 224, composition module 208 may post first rendition 220 and/or second rendition 224 to its respective consumption channel. For example, composition module 208 may post the story composition illustrated in FIGS. 13A-13D to first consumption channel 222 and/or may post the newsfeed composition illustrated in FIG. 14 to second consumption channel 226 (e.g., based on user input selecting a desired consumption channel).

As described above, the systems and methods described herein disclose a single composer that may be used to create two or more different renditions of a social media composition. The different renditions may vary in a variety of ways. For example, the different renditions may include a different media format, text format, and/or metadata format. In some examples, each rendition may be intended for a different composition consumption channel. For example, one rendition may be intended for a newsfeed channel and another rendition may be intended for a stories channel. In these examples, the features of each rendition may correspond to features of the composition consumption channel for which the rendition is intended.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive content data in one format (e.g., a format that corresponds to a stories channel) and transform the content data to another format (e.g., a format that corresponds to a newsfeed channel). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   providing, on a display element of a user device, a composition screen configured to be used to create user compositions for use with any of a plurality of different consumption channels of a social media application;
   collecting, via the composition screen, a set of one or more user inputs selecting user-selected content to be included within a user composition, the user-selected content comprising a media item and a metadata item submitted via the composition screen; and
   in response to collecting the user-selected content:
      creating a first rendering of the user composition, to be viewed from a first consumption channel, in which the metadata item is superimposed over the media item, wherein creating the first rendering comprises superimposing the metadata item over the media item; and
      creating a second rendering of the user composition, to be viewed from a second consumption channel, in which text extracted from the metadata item is used as a caption for the media item, wherein creating the second rendering comprises (1) extracting text from the metadata item and (2) using the extracted text in a plain text format as a caption for the media item.

2. The computer-implemented method of claim 1, wherein:
the first rendering comprises one or more features that differ from the features of the second rendering and that coincide with one or more features of the first consumption channel;
the second rendering comprises one or more features that differ from the features of the first rendering and that coincide with one or more features of the second composition channel;
the one or more features of the first rendering comprises the metadata item superimposed over the media items; and
the one or more features of the second rendering comprises the text used as the caption.

3. The computer-implemented method of claim 2, wherein:
the user-selected content further comprises text submitted via the composition screen; and
an appearance of the text within the first rendering differs from an appearance of the text in the second rendering.

4. The computer-implemented method of claim 2, wherein:
the media item is a photograph;
the user-selected content further comprises a plurality of photographs, comprising the media item, and text submitted via the composition screen;
the first rendering comprises a slideshow of the plurality of photographs with a cover card comprising the text; and
the second rendering comprises a collage of the plurality of photographs and the caption of the second rendering further comprises the text submitted via the composition screen.

5. The computer-implemented method of claim 1, wherein:
the first rendering comprises a story and the first consumption channel comprises a stories channel; and
the second rendering comprises a news item and the second consumption channel comprises a newsfeed.

6. The computer-implemented method of claim 1, wherein collecting the user inputs via the composition screen comprises:
collecting the user-selected content directly from the composition screen; or
collecting the user-selected content from an additional screen linked to the composition screen.

7. The computer-implemented method of claim 1, wherein the metadata item comprises a digital sticker.

8. The computer-implemented method of claim 7, wherein:
the digital sticker comprises a digital location sticker; and
the caption comprises plain text indicating the location indicated by the digital location sticker.

9. The computer-implemented method of claim 7, further comprising, upon extracting the text from the metadata item, transforming the extracted text into plain text.

10. The computer-implemented method of claim 1, wherein the metadata item comprises at least one of:
friends metadata;
location metadata; or
feelings metadata.

11. The computer-implemented method of claim 1, wherein the composition screen comprises an initial composition landing screen presented in response to receiving user input initiating a social composition process.

12. The computer-implemented method of claim 1, further comprising posting at least one of the first rendering to the first consumption channel or the second rendering to the second consumption channel.

13. The computer-implemented method of claim 12, wherein:
posting at least one of the first rendering to the first consumption channel or the second rendering to the second consumption channel comprises posting the first rendering to the first consumption channel and posting the second rendering to the second consumption channel.

14. A system comprising:
a composition module, stored in memory that:
provides, on a display element of a user device, a composition screen configured to be used to create user compositions for use with any of a plurality of different consumption channels of a social media application;
collects, via the composition screen, a set of one or more user inputs selecting user-selected content to be included within a user composition, the user-selected content comprising a media item and a metadata item submitted via the composition screen; and
in response to collecting the user-selected content:
creates, a first rendering of the user composition, to be viewed from a first consumption channel, in which the metadata item is superimposed over the media item, wherein creating the first rendering comprises superimposing the metadata item over the media item; and
creates a second rendering of the user composition, to be viewed from a second consumption channel, in which text extracted from the metadata item is used as a caption for the media item, wherein creating the second rendering comprises (1) extracting text from the metadata item and (2) using the extracted text in a plain text format as a caption for the media item; and
at least one physical processor configured to execute the composition module.

15. The system of claim 14, wherein:
the first rendering comprises one or more features that differ from the features of the second rendering and that coincide with one or more features of the first consumption channel;
the second rendering comprises one or more features that differ from the features of the first rendering and that coincide with one or more features of the second composition channel;
the one or more features of the first rendering comprises the metadata item superimposed over the media items; and
the one or more features of the second rendering comprises the text used as the caption.

16. The system of claim 15, wherein:
the user-selected content further comprises text submitted via the composition screen; and
an appearance of the text within the first rendering differs from an appearance of the text in the second rendering.

17. The system of claim 14, wherein:
the media item is a photograph;

the user-selected content further comprises a plurality of photographs, comprising the media item, and text submitted via the composition screen;

the first rendering comprises a slideshow of the plurality of photographs with a cover card comprising the text; and the second rendering comprises a collage of the plurality of photographs and the caption of the second rendering further comprises the text submitted via the composition screen.

18. The system of claim 14, wherein:

the first rendering comprises a story and the first consumption channel comprises a stories channel; and the second rendering comprises a news item and the second consumption channel comprises a newsfeed.

19. The system of claim 14, wherein the composition module collects the user inputs via the composition screen by:

collecting the user-selected content directly from the composition screen; or collecting the user-selected content from an additional screen linked to the composition screen.

20. A non-transitory computer-readable medium comprising one or more computer-readable instructions that, when executed by at least one processor of a computing device, cause the computing device to:

provide, on a display element of a user device, a composition screen configured to be used to create user compositions for use with any of a plurality of different consumption channels of a social media application;

collect, via the composition screen, a set of one or more user inputs selecting user-selected content to be included within a user composition, the user-selected content comprising a media item and a metadata item submitted via the composition screen; and in response to collecting the user-selected content:

create first rendering of the user composition, to be viewed from a first consumption channel, in which the metadata item is superimposed over the media item, wherein creating the first rendering comprises superimposing the metadata item over the media item; and create a second rendering of the user composition, to be viewed from a second consumption channel, in which text extracted from the metadata item is used as a caption for the media item, wherein creating the second rendering comprises (1) extracting text from the metadata item and (2) using the extracted text in a plain text format as a caption for the media item.

* * * * *